United States Patent
Yin et al.

(10) Patent No.: US 12,003,330 B2
(45) Date of Patent: Jun. 4, 2024

(54) SYSTEM AND METHOD OF HARQ-ACK TIMING AND PUCCH RESOURCE DETERMINATION FOR ULTRA-LOW LATENCY PDSCH TRANSMISSION

(71) Applicants: SHARP KABUSHIKI KAISHA, Sakai (JP); FG Innovation Company Limited, Tuen Mun (HK)

(72) Inventors: Zhanping Yin, Vancouver, WA (US); Tatsushi Aiba, Sakai (JP); Kazunari Yokomakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 575 days.

(21) Appl. No.: 17/265,788

(22) PCT Filed: Jul. 30, 2019

(86) PCT No.: PCT/JP2019/029861
§ 371 (c)(1),
(2) Date: Feb. 3, 2021

(87) PCT Pub. No.: WO2020/027143
PCT Pub. Date: Feb. 6, 2020

(65) Prior Publication Data
US 2021/0306107 A1 Sep. 30, 2021

Related U.S. Application Data

(60) Provisional application No. 62/714,473, filed on Aug. 3, 2018.

(51) Int. Cl.
*H04W 72/00* (2023.01)
*H04L 1/00* (2006.01)
(Continued)

(52) U.S. Cl.
CPC .......... *H04L 1/1819* (2013.01); *H04L 1/0003* (2013.01); *H04L 1/1896* (2013.01); *H04W 72/0446* (2013.01); *H04W 72/23* (2023.01)

(58) Field of Classification Search
CPC ... H04L 1/1819; H04L 1/0003; H04L 1/1896; H04L 1/1861; H04L 1/1854; H04W 72/0446; H04W 72/23
See application file for complete search history.

(56) References Cited

U.S. PATENT DOCUMENTS

2018/0219649 A1* 8/2018 Ying ................ H04W 76/27

FOREIGN PATENT DOCUMENTS

CN 102577209 A 7/2012

OTHER PUBLICATIONS

Samsung: ("HARQ-ACK Feedback Timing", 3GPP Draft; R1-1713644, 3rd Generation Partnership Project (3GPP), vol. RAN WG1, Aug. 20, 2017 (Aug. 20, 2017)).*

(Continued)

*Primary Examiner* — Lakeram Jangbahadur
(74) *Attorney, Agent, or Firm* — ScienBiziP, P.C.

(57) ABSTRACT

A user equipment (UE) and a base station (gNB) are described. The UE includes a higher layer processor configured to determine Hybrid Automatic Repeat Request-Acknowledgment (HARQ-ACK) feedback timing of HARQ-ACK feedback used for ultra-reliable low-latency communication (URLLC) physical downlink shared channel (PDSCH) transmissions. The higher layer processor is also configured to determine a physical uplink control channel (PUCCH) resource for the HARQ-ACK feedback. The UE also includes transmitting circuitry configured to transmit at least one HARQ-ACK bit based on the HARQ-ACK feedback timing and the PUCCH resource. The gNB includes a higher layer processor configured to determine HARQ-ACK (Continued)

feedback timing of HARQ-ACK feedback used for PDSCH transmissions, and to determine a PUCCH resource for the HARQ-ACK feedback. The gNB also includes reception circuitry configured to receive at least one HARQ-ACK bit based on the HARQ-ACK feedback timing and the PUCCH resource.

6 Claims, 21 Drawing Sheets

(51) Int. Cl.
*H04L 1/1812* (2023.01)
*H04L 1/1867* (2023.01)
*H04W 72/0446* (2023.01)
*H04W 72/23* (2023.01)

(56) References Cited

OTHER PUBLICATIONS

NTT Docomo et al: ("Remaining issues CA and type1 HARO-ACK codebook", May 20, 2018 (May 20, 2018)).*
Samsung; "HARQ-ACK Feedback Timing", 3GPP Draft; R1-1713644; 3GPP TSG RAN WG1 Meeting #90 Prague, Czechia, Aug. 21-25, 2017, the whole document.
NTT Docomo, Inc.; "Remaining issues CA and type1 HARQ-ACK codebook"; R1-1807071; 3GPP TSG RAN WG1 Meeting #93 Busan, Korea, May 21-25, 2018, sections 3 and 4.
Huawei, HiSilicon, PUCCH resource allocation for URLLC, 3GPP TSG RAN WGI #93 RI-1806899, May 11, 2018.
Qualcomm Incorporated, Considerations for URLLC resource allocation for PUCCH, 3GPP TSG RAN WGI #93 RI-1807362, May 12, 2018.
OPPO, Summary of offline discussion on PUCCH resource allocation, 3GPP TSG RAN WGI #93 RI-1807863, May 29, 2018.

* cited by examiner

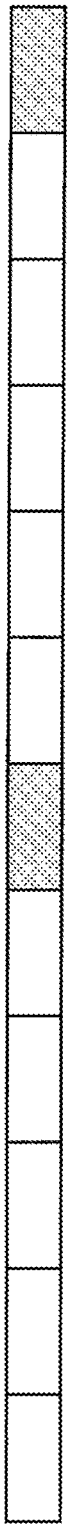     

a) Two starting symbol positions with 1-symbol PUCCH in a slot with 15 kHz SCS and extended CP b) Three starting symbol positions with 1-symbol PUCCH in a slot with 15 kHz SCS and extended CP c) Two starting symbol positions with 2-symbol PUCCH in a slot with 15 kHz SCS and extended CP d) Two starting symbol positions with 1-symbol PUCCH in a slot with 15 kHz SCS and normal CP e) Three starting symbol positions with 1-symbol PUCCH in a slot with 15 kHz SCS and normal CP f) Two starting symbol positions with 2-symbol PUCCH in a slot with 15 kHz SCS and normal CP

Figure 3

SYSTEM AND METHOD OF HARQ-ACK TIMING AND PUCCH RESOURCE DETERMINATION FOR ULTRA-LOW LATENCY PDSCH TRANSMISSION

CROSS-REFERENCE TO RELATED APPLICATION(S)

The present disclosure claims the benefit of and priority to International Application Number PCT/JP2019/029861 ("the '861 application"), filed on Jul. 30, 2019, entitled "HARQ-ACK TIMING AND PUCCH RESOURCE DETERMINATION FOR ULTRA-LOW LATENCY PDSCH TRANSMISSION", which claims the benefit of and priority to provisional U.S. Patent Application Ser. No. 62/714,473 ("the '473 provisional"), filed on Aug. 3, 2018, entitled "HARQ-ACK TIMING AND PUCCH RESOURCE DETERMINATION FOR ULTRA-LOW LATENCY PDSCH TRANSMISSION". The disclosures of the '473 provisional and '861 application are fully incorporated herein by reference.

TECHNICAL FIELD

The present disclosure relates generally to communication systems. More specifically, the present disclosure relates to HARQ-ACK timing and PUCCH resource determination for ultra-low latency PDSCH transmission.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) may include: a higher layer processor configured to: determine first Hybrid Automatic Repeat Request-Acknowledgment (HARQ-ACK) feedback timing of a first HARQ-ACK feedback used for a first physical downlink shared channel (PDSCH) transmission; determine second HARQ-ACK feedback timing of a second HARQ-ACK feedback used for a second PDSCH transmission; determine a first physical uplink control channel (PUCCH) resource for the first HARQ-ACK feedback; and determine a second PUCCH resource for the second HARQ-ACK feedback; and transmitting circuitry configured to: transmit at least one HARQ-ACK bit based on the first HARQ-ACK feedback timing and the first PUCCH resource; and transmit at least one HARQ-ACK bit based on the second HARQ-ACK feedback timing and the second PUCCH resource, wherein: the first HARQ-ACK feedback timing is determined by a first PDSCH-to-HARQ-timing indicator field in a first Downlink Control Information (DCI), and the first PDSCH-to-HARQ-timing indicator field corresponds to a value of a first radio resource control configured table, and the second HARQ-ACK feedback timing is determined by a second PDSCH-to-HARQ-timing indicator field in a second DCI, and the second PDSCH-to-HARQ-timing indicator field corresponds to a value of a second radio resource control configured table.

In one example, a base station (gNB) may include: a higher layer processor configured to: determine first Hybrid Automatic Repeat Request-Acknowledgment (HARQ-ACK) feedback timing of a first HARQ-ACK feedback used for a first physical downlink shared channel (PDSCH) transmission; determine second HARQ-ACK feedback timing of a second HARQ-ACK feedback used for a second PDSCH transmission; determine a first physical uplink control channel (PUCCH) resource for the first HARQ-ACK feedback; and determine a second PUCCH resource for the second HARQ-ACK feedback; and reception circuitry configured to: receive at least one HARQ-ACK bit based on the first HARQ-ACK feedback timing and the first PUCCH resource; and receive at least one HARQ-ACK bit based on the second HARQ-ACK feedback timing and the second PUCCH resource, wherein: the first HARQ-ACK feedback timing is determined by a first PDSCH-to-HARQ-timing indicator field in a first Downlink Control Information (DCI), and the first PDSCH-to-HARQ-timing indicator field corresponds to a value of a first radio resource control configured table, and the second HARQ-ACK feedback timing is determined by a second PDSCH-to-HARQ-timing indicator field in a second DCI, and the second PDSCH-to-HARQ-timing indicator field corresponds to a value of a second radio resource control configured table.

In a New Radio (NR) system, multiple types of services may be supported in a cell, each with different latency and reliability requirements. Furthermore, multiple types of services may be simultaneously supported by a UE. When a UE has more than one type of traffic with different latency requirements, for example, eMBB and URLLC traffic types, it is possible that HARQ-ACK feedback for URLLC DL traffic needs to be transmitted more urgently than HARQ-ACK feedback for eMBB DL traffic to provide information for retransmission of URLLC DL traffic. To guarantee that a latency requirement for URLLC DL traffic is met, a physical uplink control channel (PUCCH) for HARQ-ACK feedback for eMBB and URLLC DL traffic may need to be provided separately.

BRIEF DESCRIPTION OF DRAWINGS

FIG. 3 illustrates examples of starting symbol positions for 15 kilohertz (kHz) subcarrier spacing (SCS).

DESCRIPTION OF EMBODIMENTS

Figure 1:
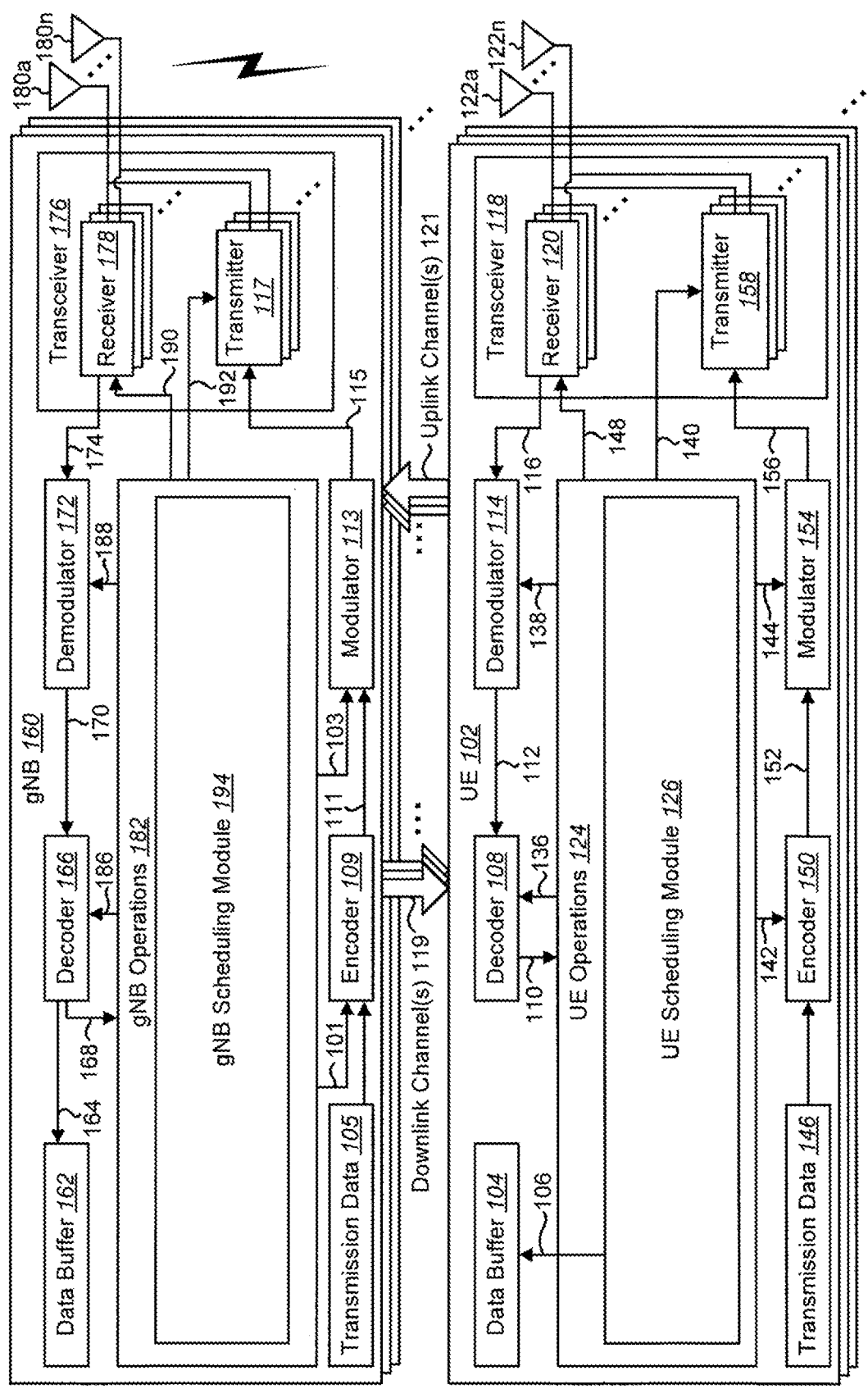
FIG. 1 is a block diagram illustrating one implementation of one or more base stations (gNBs) and one or more user equipments (UEs) in which systems and methods for HARQ-ACK timing and physical uplink control channel (PUCCH) resource determination for ultra-low latency physical downlink shared channel (PDSCH) transmission may be implemented.

A user equipment (UE) is described. The UE includes a higher layer processor configured to determine HARQ-ACK feedback timing for ultra-reliable low-latency communication (URLLC) physical downlink shared channel (PDSCH) transmissions. The higher layer processor is also configured to determine a physical uplink control channel (PUCCH) resource for HARQ-ACK feedback of the URLLC PDSCH transmissions. The UE also includes transmitting circuitry configured to transmit the HARQ-ACK feedback for the URLLC PDSCH transmissions based on the HARQ-ACK feedback timing and the PUCCH resource.

The HARQ-ACK feedback timing may be indicated in DCI, by a PDSCH-to-HARQ-timing indicator field. The PDSCH-to-HARQ-timing indicator may be used to indicate a number of symbols after a sub-slot PDSCH transmission. Different radio resource control (RRC) configured tables may be used for URLLC and enhanced mobile broadband (eMBB) HARQ-ACK feedback.

The HARQ-ACK feedback timing may be determined based on a pre-defined or configured processing time table. The processing timing table may be configured by RRC signaling. Processing timing in the processing timing table may correspond to modulation and coding scheme (MCS) settings or transport block (TB) sizes. Processing timing in the processing timing table may correspond to a PDSCH duration. A PDSCH-to-HARQ-timing-indicator field may be ignored or removed from a PDSCH scheduling DCI format for URLLC data.

In a case of multiple starting positions in a slot, an earliest PUCCH resource that satisfies the HARQ-ACK timing may be used for the HARQ-ACK feedback.

A base station (gNB) is also described. The gNB includes a higher layer processor configured to determine HARQ-ACK feedback timing for URLLC PDSCH transmissions. The higher layer processor is also configured to determine a PUCCH resource for HARQ-ACK feedback of the URLLC PDSCH transmissions. The gNB also includes transmitting circuitry configured to transmit the HARQ-ACK feedback for the URLLC PDSCH transmissions based on the HARQ-ACK feedback timing and the PUCCH resource.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

In 5G NR, different services can be supported with different quality of service (QoS) requirements (e.g., reliability and delay tolerance). For example, eMBB may be targeted for high data rate, and URLLC is for ultra-reliability and low latency. To provide ultra-reliability for URLLC traffic, the PUCCH for UCI feedback may be enhanced to the same reliability level as the data for URLLC. Due to the ultra-low latency requirements, the PUCCH format 0 (i.e., short PUCCH with up to 2 bits of UCI) is more suitable for URLLC data HARQ-ACK feedback.

To enhance the reliability of PUCCH format 0, several methods can be considered and configured separately or jointly, including multiple PRB allocation, time domain repetition, transmit diversity with two antenna port transmission, and enhanced transmit power control. Besides enhanced PUCCH format for URLLC traffic, the PUCCH resources for URLLC may be configured separately from the PUCCH resources for eMBB. Methods for time domain allocation of the enhanced PUCCH for URLLC are described herein. Additionally, methods to determine the HARQ-ACK feedback timing and PUCCH resources for URLLC PDSCH transmissions are described herein.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for HARQ-ACK timing and physical uplink control channel (PUCCH) resource determination for ultra-low latency physical downlink shared channel (PDSCH) transmission may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform low-latency physical uplink control channel (PUCCH) configuration and resource allocation. For URLLC PDSCH transmissions, the HARQ-ACK feedback of a URLLC downlink (DL) data may have the same reliability requirements as the URLLC data transmission itself. The current NR PUCCH design is targeted for an acknowledgment (ACK) miss-detection probability of 10^-2 and negative-acknowledgment (NACK) to ACK error probability of 10^-3. Therefore, some enhancements may be specified to increase the PUCCH reliability for HARQ-ACK feedback of URLLC traffic.

In NR, PUCCH format 0 is a short PUCCH with 1 or 2 symbols, and is designed for feedback of up to 2 UCI bits. To reduce the error probability of PUCCH format 0, several methods can be considered (e.g., configuring more than one physical resource block (PRB); time domain repetition; transmit diversity; different transmit power settings). These methods can be configured independently or jointly.

A new PUCCH format may be defined to capture these enhancements. This disclosure presents configurations for the reliability enhancement for a sequence-based PUCCH format 0.

Due to low latency requirements, two or more PUCCH resources may need to be configured in a single slot. The current time domain allocation for short PUCCH by configuring a single starting symbol in a slot will not be sufficient. Therefore, the PUCCH resource sets for URLLC traffic may be configured independently and separately from eMBB PUCCH resource sets. The PUCCH resource for URLLC may be configured with different parameters and/or with some different fields from that of eMBB resources.

Enhancements for time domain PUCCH resource allocation and configuration for enhanced short PUCCH are described herein. In a first method (Method 1), a PUCCH resource subset includes multiple PUCCH resources with different starting symbols in a slot. In a second method, (Method 2), a single PUCCH resource may be configured with multiple starting symbol positions in a slot. In a third method (Method 3), a PUCCH resource may start from any symbol in a slot, and the starting symbol position may be removed from the PUCCH resource configuration. In a fourth method (Method 4), a PUCCH resource may be configured with a PUCCH format and a periodicity. These methods are described in more detail below.

In both method 1 and method 2, the set of allowed starting symbols may be indicated in a PUCCH configuration. The starting symbol positions may be defined as a set of symbol indexes. The multiple starting symbol positions may be indicated as an index from a RRC configured set of symbol indexes in a slot.

Additionally in both method 1 and method 2, the starting symbol positions may be indicated as an index of a set of pre-defined patterns. In an approach, the starting symbol positions may follow some pre-defined patterns, depending on the number of PUCCH resources in a slot or a subframe. In another approach, the pattern may be configured with 0/1/2/3/4 PUCCH resources in a slot depending on the subcarrier spacing. In yet another approach, the pattern may be configured with an offset value (e.g., the number of symbols) to distribute or time domain multiplexing of different UEs.

Depending on the PUCCH resource allocation methods, different approaches may be considered to determine the HARQ-ACK feedback timing and the PUCCH resource for HARQ-ACK reporting of URLLC PDSCH transmissions. For HARQ-ACK timing, at least two methods may be considered.

In a first method (Method 1), HARQ-ACK timing is indicated in DCI, by the PDSCH-to-HARQ-timing indicator field. Instead of indicating the number of slots, the PDSCH-to-HARQ-timing indicator may be used to indicate the number of symbols after a sub-slot PDSCH transmission. Different RRC configured tables may be used for URLLC and eMBB HARQ-ACK feedback. New mechanisms or conditions may be specified to select the slot-level and symbol-level timing.

In a second method (Method 2), HARQ-ACK timing may be determined based on a pre-defined or configured processing time table. The processing timing table may be configured to a UE 102 by RRC signaling. The processing timing in the table may correspond to modulation and coding scheme (MCS) settings or transport block (TB) sizes. The processing timing in the table may correspond to the PDSCH duration. A PDSCH-to-HARQ-timing-indicator field may be ignored or removed from the PDSCH scheduling DCI format for URLLC data.

Regardless of which method is used to determine the HARQ-ACK timing, the actual PUCCH resource to be used for HARQ-ACK reporting is closely related to the HARQ-ACK resource allocation methods. In case of multiple starting positions in a slot, the earliest PUCCH resource that satisfied the HARQ-ACK timing should be used. These HARQ-ACK timing methods are described in further detail below.

Aspects of PUCCH formats in NR are described herein. PUCCH may be used to report important uplink control information (UCI), which includes HARQ-ACK, SR, channel state information (CSI), etc. While NR release-15 is designed mainly for enhanced mobile broadband (eMBB), several physical uplink control channel (PUCCH) formats are specified for different number of bits, as given below.

As used herein, µ represents subcarrier spacing configuration, where $\Delta f=2^\mu \cdot 15$ [kHz]·$N_{slot}^{subframe,\mu}$ represents the number of slots per subframe for subcarrier spacing configuration $\mu \cdot N_{slot}^{frame,\mu}$ represents the number of slots per frame for subcarrier spacing configuration $\mu \cdot N_{symb}^{slot}$ represents the number of symbols per slot.

Multiple OFDM numerologies are supported as given by Table 1 where µ and the cyclic prefix for a bandwidth part may be obtained from the higher-layer parameter subcarrierSpacing and cyclicPrefix, respectively.

TABLE 1

| µ | $\Delta f = 2\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For subcarrier spacing configuration µ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order with a frame. There are $N_{symb}^{slot}$ consecutive symbols (e.g., OFDM symbols) in a slot where $N_{symb}^{slot}$ depends on the cyclic prefix as given by Table 2 and Table 3. The start of slot $n_s^\mu$ in a subframe is aligned in time with the start of symbol $n_s^\mu N_{symb}^{slot}$ in the same subframe. Table 2 includes the number of OFDM symbols per slot, slots per frame, and slots per subframe for normal cyclic prefix. Table 3 includes the number of OFDM symbols per slot, slots per frame, and slots per subframe for extended cyclic prefix.

TABLE 2

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| µ | $N_{symb}^{slot}$ | $N_{slot}^{frame,\mu}$ | $N_{slot}^{subframe,\mu}$ |
|---|---|---|---|
| 2 | 12 | 40 | 4 |

The physical uplink control channel supports multiple formats as shown in Table 4. In case frequency hopping is configured for PUCCH format 1, 3, or 4, the number of symbols in the first hop is given by $\lfloor N_{symb}^{PUCCH}/2 \rfloor$ where $N_{symb}^{PUCCH}$ is the length of the PUCCH transmission in OFDM symbols.

TABLE 4

| PUCCH format | Length in OFDM symbols $N_{symb}^{PUCCH}$ | Number of bits |
|---|---|---|
| 0 | 1-2 | ≤2 |
| 1 | 4-14 | ≤2 |
| 2 | 1-2 | >2 |

TABLE 4-continued

| PUCCH format | Length in OFDM symbols $N_{symb}^{PUCCH}$ | Number of bits |
|---|---|---|
| 3 | 4-14 | >2 |
| 4 | 4-14 | >2 |

In 5G NR, different services can be supported with different quality of service (QoS) requirements (e.g., reliability and delay tolerance). For example, eMBB may be targeted for high data rate, and URLLC is for ultra-reliability and low latency.

The URLLC traffic may use the same numerology as eMBB service. The URLLC downlink transmission may also use a different SCS than eMBB DL transmission. For example, the URLLC traffic may use a higher numerology than eMBB service (i.e., the subcarrier spacing (SCS) of a URLLC transmission may be larger than that of an eMBB transmission). A larger SCS configuration for URLLC reduces the length of an OFDM symbol, and thus the latency of a transmission and its HARQ-ACK feedback.

In some approaches, the URLLC DL transmission and UL transmission may be configured with the same numerology. In other approaches, the URLLC DL transmission and UL transmission may be configured with the different numerologies. For HARQ-ACK feedback for of DL URLLC transmission, a URLLC short PUCCH may use a different numerology than other short PUCCH. For example, the URLLC PUCCH may have shorter symbol lengths than other short PUCCH or PUSCH transmissions.

To provide ultra-reliability for URLLC traffic, a different CQI and MCS table maybe configured for URLLC with $10^{-5}$ error probability. At the same time, the PUCCH for HARQ-ACK feedback of URLLC data may be enhanced at least to the same reliability level as the data for URLLC.

For URLLC traffic, several aspects may be considered for PUCCH design and PUCCH transmissions. URLLC traffic requires ultra-reliability and low latency. The HARQ-ACK for URLLC packet may be supported to provide the required reliability. Furthermore, the HARQ-ACK feedback may be reported immediately after a URLLC transmission. Moreover, the HARQ-ACK feedback may have the same reliability as the URLLC data transmission (i.e., the current PUCCH channel BER requirements of 1% or 0.1% may not satisfy the URLLC requirements). The HARQ-ACK BER requirement may be the same or better than the URLLC data channel (i.e., at least $10^{-5}$ or $10^{-6}$).

The URLLC traffic may share the HARQ-ACK processes with eMBB. However, the number of HARQ-ACK processes for URLLC can be limited (e.g., only 1 or 2 HARQ-ACK processes for URLLC traffic). Thus, the PUCCH format for URLLC DL transmission may also provide ultra-reliability and low latency after a URLLC DL transmission. Only short PUCCH may be used for URLLC HARQ-ACK feedback. The position of short PUCCH can be determined dynamically based on URLLC DL data transmission (e.g., immediately after a URLLC DL transmission with a gap satisfying the processing time requirements).

Due to the ultra-low latency requirements, the PUCCH format 0 (i.e., the short PUCCH with up to 2 bits of UCI) is more suitable for URLLC data HARQ-ACK feedback. The NR PUCCH format 0 occupies a single physical resource block (PRB) and uses sequences to indicate up to 2 bits of payload. For URLLC HARQ-ACK feedback, the reliability of PUCCH format 0 may be enhanced to at least an error rate of $10^{-5}$ or $10^{-6}$ (e.g., the ACK to NACK error probability may be $10^{-5}$, and NACK to ACK error probability may be $10^{-6}$).

A new PUCCH format may be specified for a short PUCCH with ultra-high reliability by extending the PUCCH format 0. The new PUCCH format may be named as PUCCH format 5, PUCCH format 0_1, advanced PUCCH format 0 (PUCCH format 0a), enhanced PUCCH format 0 (PUCCH Format 0e), ultra-reliable PUCCH format 0 (PUCCH format 0_r, or format 0_u), etc.

Allocating more resources may be used to increase the PUCCH reliability. One or more approaches may be used to increase the reliability, at least for PUCCH format 0. For example, more than one PRBs may be configured for a sequence based PUCCH format 0 with ultra-reliability. In another approach, PUCCH format 0 may be configured with 1 or 2 symbols. Besides the number of PRBs, time domain repetition is another way to provide redundancy and reliability for PUCCH. In another approach, Transmit diversity (TxD) may also increase the reliability. With TxD, the PUCCH signal is transmitted on two antenna ports, each using a separate PUCCH PRB resource. In yet another approach, another way to increase the reliability is to increase the transmit power. For example, an enhanced PUCCH format 0 for URLLC may be configured with a higher transmit power than a normal PUCCH format 0.

These approaches may be configured independently or jointly. A new PUCCH format may be defined to capture these enhancements. The new PUCCH format may be named as PUCCH format 5, PUCCH format 0_1, advanced PUCCH format 0 (PUCCH format 0a), enhanced PUCCH format 0 (PUCCH Format 0e), ultra-reliable PUCCH format 0 (PUCCH format 0_r, or format 0_u), etc. In the following context, the term PUCCH format 0_1 is used as an example. This term may be renamed by other PUCCH formats or terms.

To support more than one PRB, the PUCCH Format 0_1 resource configuration shall have a new field on the number of PRBs. The parameter can be indicated as an integer number (e.g., any number between 1 and 8). The parameter may be indicated as an index of a set of pre-defined values (e.g., {1, 2, 4, 8}). The number of potential values of the set determines the number of bits used to indicate the parameter. Listing 1 illustrates a possible PUCCH format 0_1 configuration, where the nrofPRBs field indicates the number of PRBs.

Listing 1

-- A PUCCH Format 0_1 resource configuration
-- Corresponds to L1 parameter 'PUCCH-F0_1-resource-config'
PUCCH-format0_1                SEQUENCE {
  startingSymbolIndex          INTEGER(0..13),
  nrofSymbols                  ENUMERATED {n1, n2},
  startingPRB
    INTEGER(0..maxNrofPhysicalResourceBlocks-1),
  nrofPRBs                     PUCCH-F0_1-number-of-PRB,
  frequency Hopping            BOOLEAN,
  initialCyclicShift           INTEGER(0..11)
}

The UE 102 may be configured with a separate PUCCH resource set for enhanced PUCCH format 0 from the "normal" PUCCH format (i.e., the PUCCH resource sets for URLLC traffic may be configured independently and separately from eMBB PUCCH resource sets). The PUCCH resource for URLLC may be configured with different parameters and/or with some different fields from that of eMBB resources. Here, the PUCCH resource for URLLC may be configured per PUCCH format. Also, the PUCCH resource for URLLC may be configured only for the short PUCCH format(s) (i.e., the PUCCH format 0 and/or the PUCCH format 2). For example, only for the HARQ-ACK transmission, the PUCCH resource for URLLC may be configured only for the short PUCCH format(s).

In NR, multiple PUCCH resource sets may be configured for different payload sizes. In each PUCCH resource set, up to 16 PUCCH resources can be configured. If the number of resources is more than 4, subsets are formed. In NR, for a PUCCH reporting, the PUCCH resource set may first be determined based on the UCI payload size. The ARI field may indicate the PUCCH resource subset in a PUCCH resource set. If there are more than 1 PUCCH resource in each subset, the PUCCH resource for UCI reporting may be determined implicitly based on CCE index of the scheduling DCI. Namely, the PUCCH resource subset(s) for URLLC or eMBB may be indicated by using the ARI field. Also, the PUCCH resource(s) for URLLC or eMBB may be determined based on CCE index of the scheduling DCI (e.g., the CCE index of PDCCH scheduling PDSCH transmission).

For URLLC, the short PUCCH format(s) may be useful because of the low latency requirements. At least one PUCCH resource set for up to 2 bits of UCI may be configured. Since URLLC has different reliability and delay requirements from eMBB. The HARQ-ACK feedback PUCCH resources for URLLC may be configured separately from eMBB. The PUCCH resources for URLLC may be configured with different parameters than normal PUCCH resources for eMBB.

Figure 2:
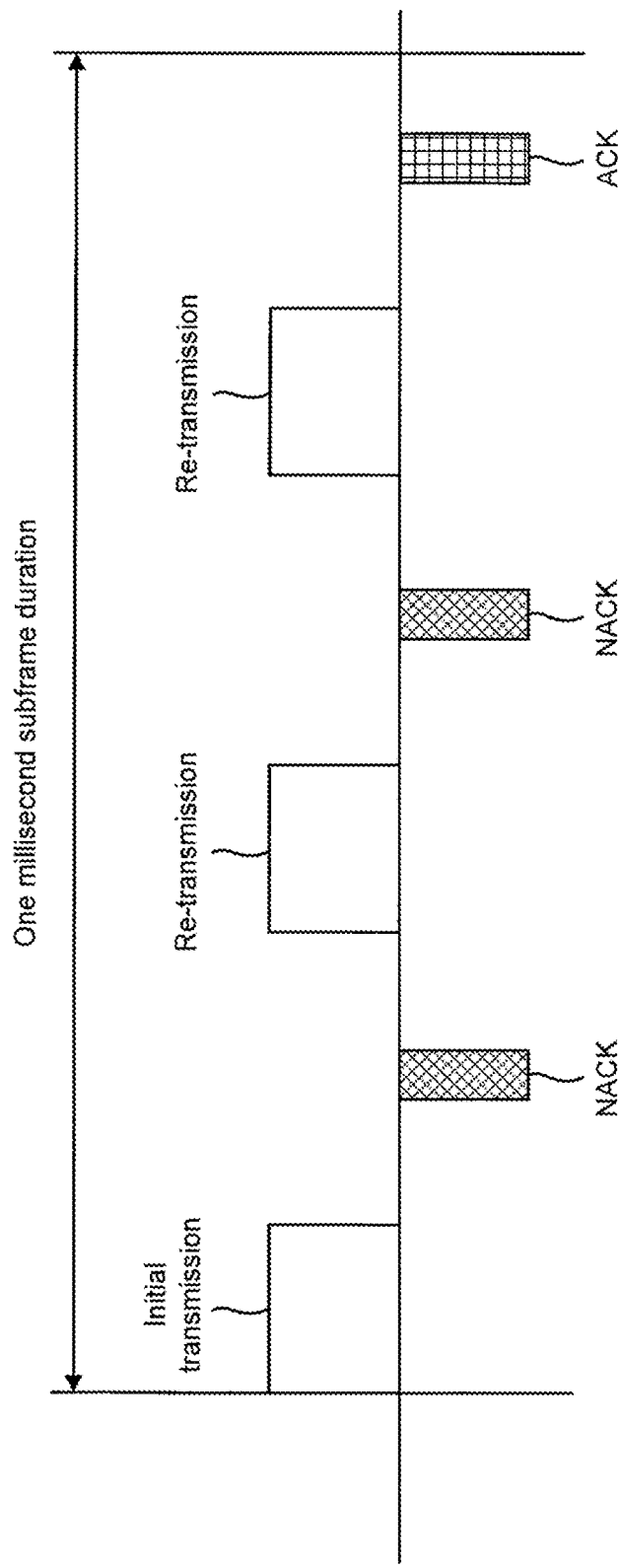
FIG. 2 is an example illustrating sub-slot ultra-reliable low-latency communication (URLLC) physical downlink shared channel (PDSCH) and HARQ-ACK feedback within 1 subframe.

To provide desired reliability for DL URLLC transmission, PUCCH resources may be allocated to allow PDSCH retransmissions. Due to high reliability and low latency requirements, to support re-transmission of URLLC PDSCH, one or more HARQ-ACK feedback may be reported within a subframe, and 2 or more PUCCH resources may be configured in a subframe or a slot, as shown in FIG. 2.

The current time domain allocation for a PUCCH resource by configuring a starting symbol and a duration may not be sufficient. Methods for enhancements for time domain allocation and configuration for enhanced short PUCCH are described herein.

As described above, method 1 may include multiple PUCCH resources with different starting symbols in a subset of PUCCH resources. Within a PUCCH resource set, a PUCCH resource subset may be configured with multiple PUCCH resources with different starting symbols in a slot. Each PUCCH resource is configured with all the required parameters, including the starting symbol, duration, starting RB, and/or number of RBs, etc. In case of multiple PUCCH resource subsets, each subset may be implicitly or explicitly mapped based on the HARQ-ACK resource indication (ARI) of a scheduling DCI format.

The PUCCH resources in a subset may have the same format with only different starting symbols, configured in startingSymbolIndex field by an integer number in (0 . . . 13). Alternatively, several different starting symbol sets can be configured by higher layer signaling, and the index of a starting symbol set may be indicated by RRC or DCI to the UE 102.

As described above, method 2 may include an enhanced PUCCH resource with multiple starting symbol positions in a slot. In this method, a single PUCCH resource may be configured with multiple allowed starting symbol positions in a slot. Thus, the startingSymbolIndex field in a PUCCH format configuration is not limited to a single integer number. It can be configured by a set of starting positions. The set of allowed starting symbols may be indicated in a PUCCH configuration.

As described above, in method 3, all symbols may be allowed as a starting symbol. As a special handling method, every symbol may be allowed to be a starting symbol provided the configured PUCCH resource is contained in a slot. In this case, the starting symbol index may include all candidate symbol indexes. Alternatively, a starting symbol set with all symbols are configured in the starting symbol sets configured by higher layer signaling, and the index of the starting symbol set with all symbols may be indicated by RRC or DCI to the UE 102.

In another approach, since every symbol is allowed to be a starting symbol, the startingSymbolIndex field may be removed or ignored from a PUCCH resource allocation parameter.

The PUCCH resource may not support cross-slot boundary allocation. Thus, a 1-symbol PUCCH may start from any symbol in a slot, and a 2-symbol PUCCH may start from symbol index {0 . . . 12}. In another case, cross-slot boundary allocation may be allowed, so that no restriction is needed for the starting symbol position.

As described above, in method 4, a PUCCH resource may be configured with a PUCCH format and a periodicity. In this method, a PUCCH resource may be configured with a PUCCH format (e.g., an enhanced PUCCH format 0 with a 1 or 2 symbol duration). To provide ultra-low latency HARQ-ACK feedback and data retransmission, the periodicity may be less than or equal to 0.5 ms. The PUCCH format may include a starting symbol in a slot. Alternatively, an offset value may be configured to determine the PUCCH position within a period. The offset value may be indicated as a number of symbols.

The periodicity may be specified as a number of symbols. This may be beneficial if the SCS is lower (e.g., 15 kHz or 30 kHz). At least the following periodicity may be supported: periodicity of two symbols; periodicity of 7 symbols (or half a slot) for symbols with normal cyclic prefix (NCP); periodicity of 6 symbols (or half a slot) for symbols with extended cyclic prefix (ECP).

If the SCS configuration is high for a PUCCH reporting cell (e.g., more than 30 kHz), the periodicity may be specified as a number of slots instead. For example, a PUCCH resource every 1 slot for 60 kHz SCS or a PUCCH resource every 2 slots for 120 kHz SCS.

Potential starting symbol positions and configuration are described herein. For both multiple PUCCH resources with different starting symbols in a subset of PUCCH resources and enhanced PUCCH resource with multiple starting positions in a slot, several approaches are described to determine the potential starting symbols of the PUCCH resources. In one approach, the set of starting positions may be configured by a set of symbol indexes with numbers from integer values in (0 . . . 13). In one case, the PUCCH may start from any symbol in a slot provided the configured PUCCH resource is contained in a slot (i.e., a single PUCCH resource is not allowed to cross slot boundaries). The PUCCH repetitions may occur in different slots. In another case, the starting symbol of the PUCCH resources may be limited to a subset of symbols (e.g., only start from even numbered indexes or only odd numbered indexes).

In a case of multiple PUCCH resources with different starting symbols in a subset of PUCCH resources, each resource in the subset that is mapped to the same ARI may have a different starting symbol in a slot. In a case of an enhanced PUCCH resource with multiple starting symbol positions in a slot, the PUCCH resource configuration may be enhanced to allow multiple starting symbol positions in the configuration, as shown below in Listing 2 with the example using enhanced Format 0. The same principle may be applied for other PUCCH formats.

---
Listing 2
---

```
-- A PUCCH Format 0_1 resource configuration
-- Corresponds to L1 parameter 'PUCCH-F0_1-resource-config'
PUCCH-format0_1                SEQUENCE {
   startingSymbolIndex              {a set of symbol
indexes represented by INTEGER(0..13)},
   nrofSymbols                   ENUMERATED {n1, n2},
   startingPRB
   INTEGER(0..maxNrofPhysicalResourceBlocks-1),
   nrofPRBs                      PUCCH-F0_1-number-of-PRB,
   frequencyHopping              BOOLEAN,
   initialCyclicShift            INTEGER(0..11)
}
```

In another approach, several sets of starting symbols in a slot may be configured to a UE 102 by higher layer signaling (e.g., RRC signaling) and the multiple starting symbol positions may be indicated as an index from the RRC configured sets of symbol indexes in a slot. For example, up to 4 sets of starting symbol indexes may be configured by RRC, and 2 bits are used to indicate which set is used in the PUCCH resource configuration. An example of this approach is illustrated in Listing 3.

---
Listing 3
---

```
-- A PUCCH Format 0_1 resource configuration
-- Corresponds to L1 parameter 'PUCCH-F0_1-resource-config'
PUCCH-format0_1                SEQUENCE {
   startingSymbolIndex              {index of a RRC
configured set of starting symbol positions},
   nrofSymbols                   ENUMERATED {n1, n2},
   startingPRB
   INTEGER(0..maxNrofPhysicalResourceBlocks-1),
   nrofPRBs                      PUCCH-F0_1-number-of-PRB,
   frequencyHopping              BOOLEAN,
   initialCyclicShift            INTEGER(0..11)
}
```

In yet another approach, the allowed starting symbol positions may follow some pre-defined patterns, depending on the number of PUCCH resources in a slot or a subframe. The pattern may be configured with 1/2/3/4 PUCCH resources in a slot depending on the subcarrier spacing (SCS) of the PUCCH transmission carrier and bandwidth part (BWP). For URLLC traffic, the DL and UL may be configured with normal cyclic prefix (CP) or extended CP. The same CP configuration should be applied to both URLLC DL and UL transmissions.

For SCS with 15 kHz, each subframe is 1 ms with 1 slot and 14 symbols for normal CP and 12 symbols for extended CR. Considering the sub-slot PDSCH transmission, processing time, there may be a maximum of 2 or 3 PUCCH allocations in a subframe. FIG. 3 provides some patterns for 15 kHz SCS. With 2 potential PUCCH positions in a slot, one re-transmission can be supported within 1 ms. With 3 potential PUCCH positions in a slot, two re-transmissions can be supported within 1 ms. The patterns can be fixed for each configuration based on the PUCCH duration.

Figure 4:
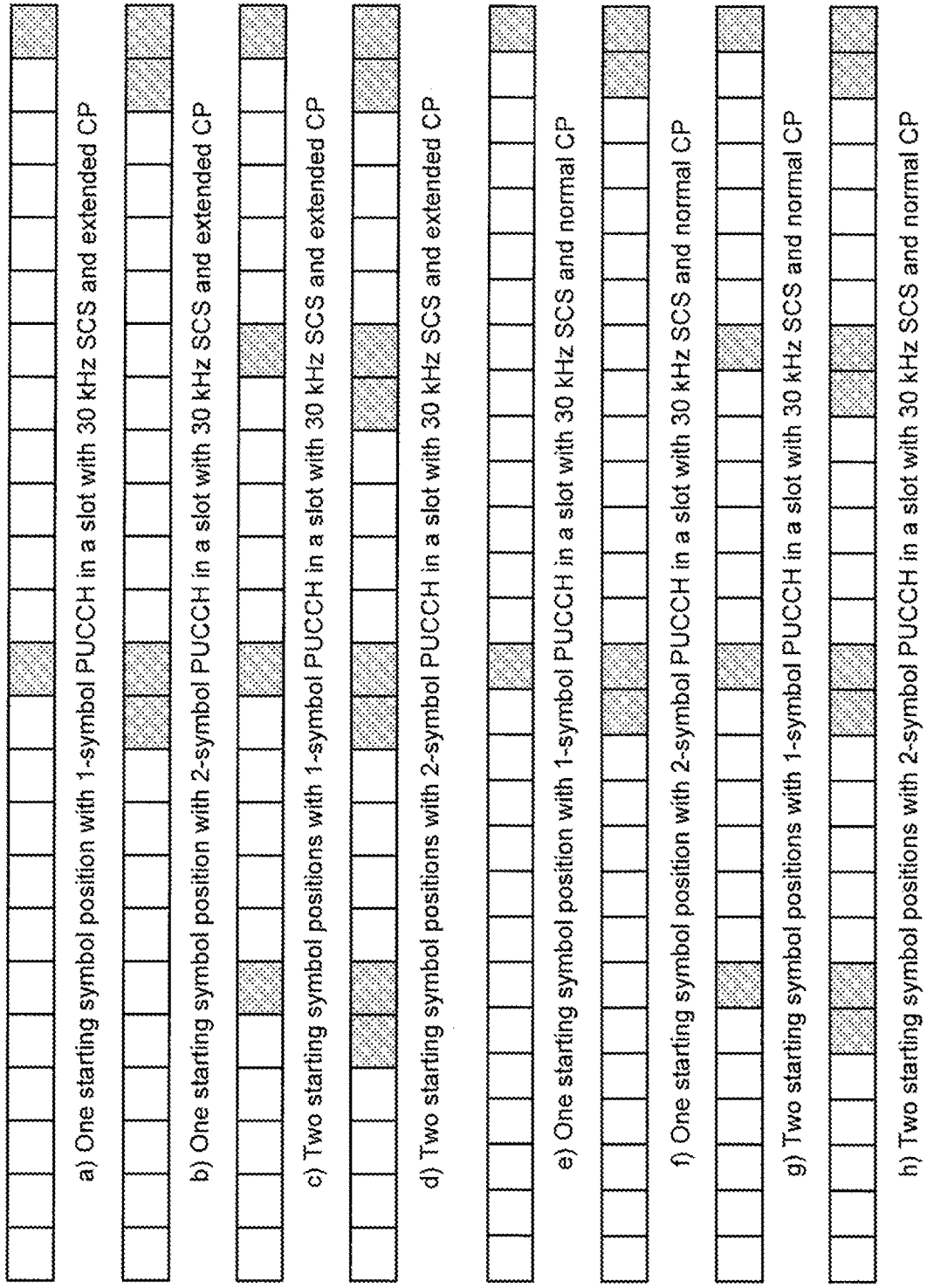
FIG. 4 illustrates examples of starting symbol positions for 30 kHz SCS.

For SCS with 30 kHz, each subframe is 1 ms with 2 slots and 28 symbols for normal CP and 24 symbols for extended CP. Considering the sub-slot PDSCH transmission, processing time, there may be 1 or 2 PUCCH allocations in a slot, thus 2 or 4 potential starting positions in a subframe. FIG. 4 provides some patterns for 30 kHz SCS. With one PUCCH positions in a slot, one re-transmission can be supported within a 1 ms subframe. With 2 PUCCH positions in a slot, three re-transmissions can be supported within a 1 ms subframe. Considering the HARQ-ACK processes, the maximum number of re-transmissions may be limited to 3. Thus, 4 potential PUCCH positions within a 1 ms subframe should be sufficient to guarantee the 1 ms delay requirements and the ultra-reliability of data delivery. The patterns can be fixed for each configuration based on the PUCCH duration.

Figure 5:
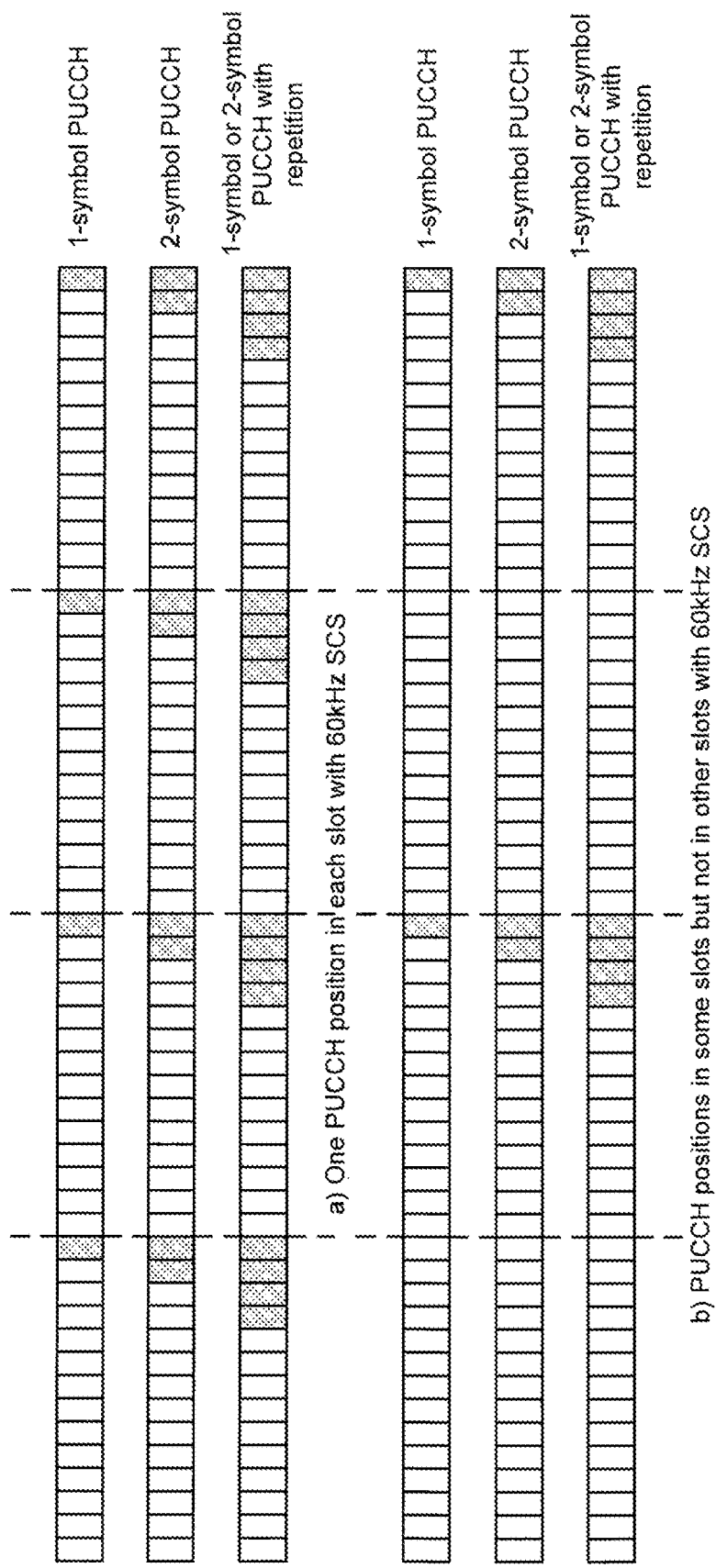
FIG. 5 illustrates examples of starting symbol positions for 60 kHz SCS.

For SCS with 60 kHz, each subframe is 1 ms with 4 slots. FIG. 5 uses normal CP as an example. In another example, the same PUCCH location within a slot (i.e., the last one or several symbols in a slot) can be used for extended CP.

Similarly, for SCS with 120 kHz and 240 kHz, PUCCH does not need to be configured for every slot. For example, to allow 4 PUCCH transmissions in a subframe, a PUCCH resource can be configured in every 2 slots for 120 kHz SCS, and in every 4 slots for 240 kHz SCS.

A set of starting symbol position patterns may be defined in the standard. Or a set of starting symbol position patterns may be configured to the UE 102 by higher layer signaling (e.g., RRC signaling). The starting symbol positions may be indicated to a UE 102 as an index of a set of pre-defined patterns. The patterns may be dependent on the PUCCH format and/or SCS configuration of the PUCCH carrying carrier or BWP.

Figure 6:
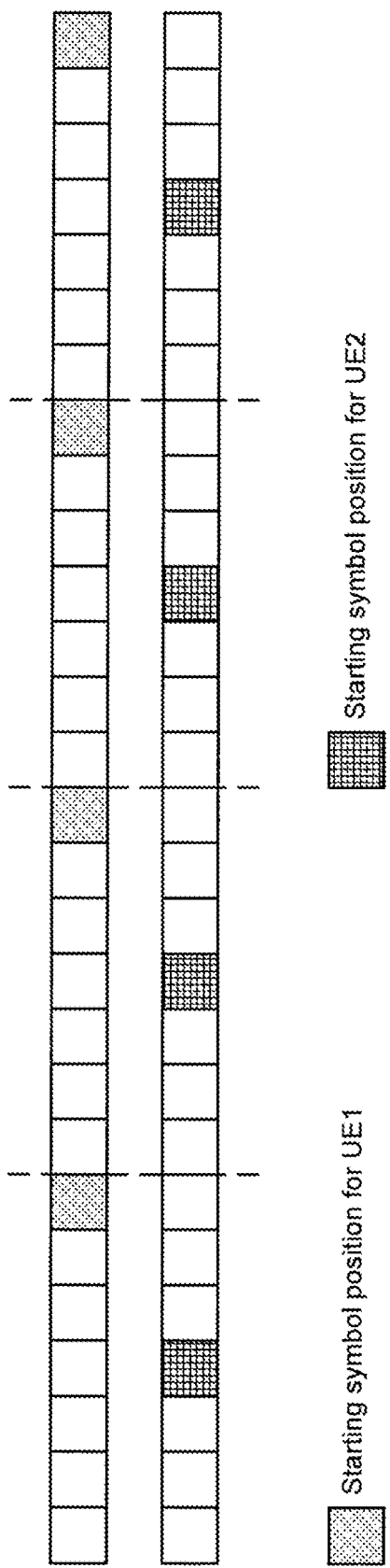
FIG. 6 illustrates an example of time domain distribution and multiplexing of PUCCH allocation for different UEs.

Furthermore, a starting symbol position pattern may be configured with an offset value. The offset value can be the number of shifted symbols from the standard pattern. The patterns with different shifts may distribute the time domain PUCCH locations for different UEs 102 to achieve better UE time domain multiplexing of PUCCH channels, as shown in FIG. 6. For PUCCH resource configuration, both the starting symbol position pattern and the offset value should be configured for a UE 102. An example of starting symbol position pattern and offset value configuration is illustrated in Listing 4.

---

Listing 4

---

PUCCH-format0_1          SEQUENCE {
  startingSymbolIndex              {index of a RRC configured set of starting symbol positions},
  startingSymbolPatternOffset      INTEGER(0..12)
  nrofSymbols                      ENUMERATED {n1, n2},
  startingPRB                      INTEGER(0..maxNrofPhysicalResourceBlocks-1),
  nrofPRBs                         PUCCH-F0_1-number-of-PRB,
  frequencyHopping                 BOOLEAN,
  initialCyclicShift               INTEGER(0..11)
}

---

As described above, the UE 102 may transmit on the PUCCH for URLLC, HARQ-ACK of URLLC DL data (e.g., URLLC PDSCH transmission). Also, the UE 102 may transmit on the PUCCH for eMBB, HARQ-ACK of eMBB DL data (e.g., eMBB PDSCH transmission). Namely, for the HARQ-ACK transmission corresponding to URLLC DL data, the UE 102 may use the PUCCH resource for URLLC. Also, for the HARQ-ACK transmission corresponding to eMBB DL data, the UE 102 may use the PUCCH resource for eMBB.

Here, the PDSCH corresponding to URLLC DL data and/or the PDSCH corresponding to eMBB DL data may be identified based on a parameter(s) configured by the gNB 160. For example, the gNB 160 may transmit by using the RRC message, the parameter(s) used for identifying that the PDSCH transmission is corresponding to URLLC DL data or eMBB DL data.

Also, the PDSCH corresponding to URLLC DL data may be scheduled (e.g., identified) by using the DCI format(s) with CRC scrambled by Y-RNTI different from the C-RNTI. Here, the PDSCH corresponding to eMBB DL data may be scheduled (e.g., identified) by using the DCI format(s) with CRC scrambled by the C-RNTI. Here, the Y-RNTI may be used for identifying a first CQI table and/or a first MCS table. Also, the C-RNTI may be used for identifying a second CQI table and/or a second MCS table. The first and second CQI tables may be used for interpretation of CQI indices for CQI reporting. Also, the first and second MCS tables may be used to determine a modulation order and/or a target error rate. Namely, the PDSCH corresponding to URLLC DL data and/or the PDSCH corresponding to eMBB DL data may be identified based on a corresponding CQI table(s) and/or MCS table(s).

Also, the PDSCH corresponding to URLLC DL data and/or the PDSCH corresponding to eMBB DL data may be identified based on a duration(s) of PDSCH transmission(s). Here, the duration(s) of PDSCH transmission(s) may be configured/indicated by the gNB 160. For example, the gNB 160 may transmit by using the RRC message, information used for configuring (e.g., determining) the duration(s) of the PDSCH transmission(s). Also, the gNB 160 may transmit by using the DCI format(s), information used for indicating the duration(s) of the PDSCH transmission(s). For example, the duration(s) for the PDSCH corresponding to URLLC DL data may be a symbol level(s) (e.g., 2 symbols, 3 symbols, and/or 5 symbols). And, the duration for the PDSCH corresponding to eMBB DL data may be a slot level (e.g., 1 slot, 2 slots, 5 slots). Namely, the PDSCH transmission corresponding to URLLC DL data may support a shorter duration(s) than the PDSCH transmission corresponding eMBB DL data.

Regarding HARQ-ACK feedback timing, a UE 102 may transmit one or more PUCCHs on a serving cell in different symbols within a slot of $N_{symb}^{slot}$ symbols. With reference to slots for PUCCH transmissions, if the UE 102 detects a DCI format 1_0 or a DCI format 1_1 scheduling a PDSCH reception or a DCI format 1_0 indicating an SPS PDSCH release over a number of symbols where the last symbol is within slot n, the UE 102 may provide corresponding HARQ-ACK information in a PUCCH transmission within slot n+k, where k is a number of slots and is indicated by the PDSCH-to-HARQ-timing-indicator field in the DCI format.

In some implementations, for DCI format 1_1, the PDSCH-to-HARQ-timing-indicator field values map to values for a number of slots indicated by higher layer parameter DL-data-DL-acknowledgement as defined in 3GPP 38.213 Table 9.2.3-1 from a set of number of slots provided by higher layer parameter Slot-timing-value-K1.

For DCI format 1_0, the PDSCH-to-HARQ-timing-indicator field values map to {1, 2, 3, 4, 5, 6, 7, 8}. For a PDSCH reception in slot n without an associated DCI format 1_0 or DCI format 1_1 detection and for HARQ-ACK transmission in a PUCCH, the UE 102 may transmit the PUCCH in slot n+k unless the UE 102 is provided higher layer parameter UL-DL-configuration-common, or higher layer parameter UL-DL-configuration-common-Set2, or higher layer parameter UL-DL-configuration-dedicated indicating at least one symbol for the PUCCH transmission in slot n+k as a downlink symbol.

If the UE 102 detects a DCI format that does not include a PDSCH-to-HARQ-timing-indicator field and schedules a PDSCH reception over a number of symbols where the last symbol is within slot n, the UE 102 may provide corresponding HARQ-ACK information in a PUCCH transmission within slot n+k.

In NR, the HARQ-ACK feedback timing may be determined by the PDSCH-to-HARQ-timing-indicator field. The PDSCH-to-HARQ-timing-indicator field indicates the number of slots required for HARQ-ACK feedback after the PDSCH reception.

For URLLC traffic, it may be beneficial for the HARQ-ACK to be reported very quickly (e.g., within a slot). One or more HARQ-ACK feedback may be fit in a 1 millisecond (ms) subframe. Therefore, the PDSCH-to-HARQ-timing-indicator field to indicate the number of slots may not be sufficient for URLLC PDSCH transmissions.

Depends on the PUCCH resource allocation methods, different methods may be considered to determine the HARQ-ACK feedback timing and the PUCCH resource for HARQ-ACK reporting of URLLC PDSCH transmissions.

As described above, for HARQ-ACK timing, at least two methods may be considered. In a first method (Method 1), HARQ-ACK timing is based on an explicit timing indication with re-interpretation of the PDSCH-to-HARQ-timing indicator field. HARQ-ACK timing is indicated in DCI, by the PDSCH-to-HARQ-timing indicator field. The PDSCH-to-HARQ-timing indicator may be reused. However, for URLLC or sub-slot PDSCH transmissions, it should be linked to a different RRC configured table, or point to a table with fixed values. The values in the new RRC configured HARQ-ACK timing table may be used to interpreted differently from the legacy HARQ-ACK timing table in current NR specification.

In one approach, instead of indicating the number of slots, the value indicated by the PDSCH-to-HARQ-timing indicator may be used to indicate the number of symbols after the last symbol of a URLLC or sub-slot PDSCH transmission.

In another approach, instead of indicating the number of slots, the value indicated by the PDSCH-to-HARQ-timing indicator may be used to indicate the number of sub-slots after the last symbol of the PDSCH transmission, where the sub-slot length is determined by the length of the URLLC or sub-slot PDSCH transmission.

In a second method (Method 2), HARQ-ACK timing may be determined based on a pre-defined or configured HARQ-ACK timing table. In this method, a UE 102 may determine the HARQ-ACK timing using a separate HARQ-ACK timing table based on the processing time requirements and UE capability, etc. The HARQ-ACK timing does not need to be indicated in the DCI, and the PDSCH-to-HARQ-timing-indicator field may be ignored or removed from the DCI format. The HARQ-ACK timing table may be configured to a UE 102 by RRC signaling.

In one approach, the HARQ-ACK timing table may correspond to MCS settings or TB sizes. The number of entries in the table can be limited to 4 or 8. A pseudo-code structure of this approach may be as follows: if the TB size is smaller than or equal to a threshold P0, the HARQ-ACK is reported k0 symbols after the last symbol of the PDSCH transmission; if the TB size is larger than P0 and smaller than or equal to P1, the HARQ-ACK is reported k1 symbols after the last symbol of the PDSCH transmission, where k1>k0; if the TB size is larger than P1 and smaller than or equal to P2, the HARQ-ACK is reported k2 symbols after the last symbol of the PDSCH transmission, where k2>k1; and so forth.

For example, following this pseudo-code structure, if the TB size is smaller than or equal to 512, HARQ-ACK may be reported 2 symbols after the PDSCH transmission. If the TB size is greater than 512 and smaller than or equal to 1024, HARQ-ACK is reported 4 symbols after the PDSCH transmission, etc.

In another approach, the HARQ-ACK timing table may correspond to the number of symbols of the PDSCH transmission. The number of entries in the table can be limited to 4 or 8. A pseudo-code structure of this approach may be as follows: if the number of symbols of the PDSCH transmission is smaller than or equal to a threshold N0, the HARQ-ACK is reported k0 symbols after the last symbol of the PDSCH transmission; if the number of symbols of the PDSCH transmission is larger than N0 and smaller than or equal to a threshold N1, the HARQ-ACK is reported k1 symbols after the last symbol of the PDSCH transmission, where k1>k0; if the number of symbols of the PDSCH transmission is larger than N1 and smaller than or equal to a threshold N2, the HARQ-ACK is reported k2 symbols after the last symbol of the PDSCH transmission, where k2>k1; and so forth.

For example, if the number of symbols of the PDSCH transmission is smaller than or equal to 2 symbols, HARQ-ACK may be reported 2 symbols after the PDSCH transmission. If the number of symbols of the PDSCH transmission is greater than 2 symbols and smaller than or equal to 4 symbols, HARQ-ACK may be reported 4 symbols after the PDSCH transmission, etc.

In yet another approach, the HARQ-ACK timing table may correspond to the PDSCH duration. The number of entries in the table can be limited to 4 or 8. A pseudo-code structure of this approach may be as follows: if the duration of the PDSCH transmission is smaller than or equal to a threshold L0, the HARQ-ACK is reported k0 symbols after the last symbol of the PDSCH transmission; if the duration of the PDSCH transmission is larger than L0 and smaller than or equal to a threshold L1, the HARQ-ACK is reported k1 symbols after the last symbol of the PDSCH transmission, where k1>k0; if the duration of the PDSCH transmission is larger than L1 and smaller than or equal to a threshold L2, the HARQ-ACK is reported k2 symbols after the last symbol of the PDSCH transmission, where k2>k1; and so forth.

For example, if the duration of the PDSCH transmission is smaller than or equal to ⅛ ms, HARQ-ACK is reported 2 symbols after the PDSCH transmission; if the number of symbols of the PDSCH transmission is greater than ⅛ ms and smaller than or equal to ¼ ms, HARQ-ACK is reported 4 symbols after the PDSCH transmission, etc.

Determination of slot level or sub-slot level HARQ-ACK timing is also described herein. To support slot-level HARQ-ACK timing (e.g., for eMBB service) and sub-slot or symbol level HARQ-ACK timing, different RRC configured tables may be configured and used for URLLC and eMBB HARQ-ACK feedback. New mechanisms or conditions may be specified to select the slot-level and symbol/sub-slot level timing.

The use of slot based or symbol/sub-slot based timing, may be determined based on whether the PDSCH is a slot based scheduling or a symbol/sub-slot based scheduling. That is, for a slot level PDSCH transmission, the field may indicate the number of slots after the PDSCH transmission to the HARQ-ACK feedback. For a sub-slot level PDSCH transmission, the field may indicate the number of symbols or sub-slots after the PDSCH transmission to the HARQ-ACK feedback.

The sub-slot level PDSCH transmission HARQ-ACK timing may be further restricted based on the number of symbols of the PDSCH transmission. If the number of symbols for a PDSCH transmission is less than or equal to a threshold value (e.g., 4 symbols or 7 symbols), the field may indicate the number of symbols or sub-slots after the PDSCH transmission to the HARQ-ACK feedback. The HARQ-ACK timing and PUCCH resources configured for ultra-reliability and ultra-low latency may be used.

If the number of symbol for a PDSCH transmission is greater than the threshold value (e.g., 4 symbols or 7 symbols), the sub-slot transmission may be treated the same way as a slot based PDSCH transmission, and the field indicates the number of slots after the slot for PDSCH transmission to the HARQ-ACK feedback. The regular HARQ-ACK timing and PUCCH resources may be used.

The sub-slot level PDSCH transmission HARQ-ACK timing may be further restricted based on the duration of the PDSCH transmission. If the number of symbol for a PDSCH transmission is less than or equal to a threshold value (e.g., 0.25 ms or 0.5 ms), the field may indicate the number of symbols or sub-slots after the PDSCH transmission to the HARQ-ACK feedback. The HARQ-ACK timing and PUCCH resources configured for ultra-reliability and ultra-low latency may be used.

If the number of symbol for a PDSCH transmission is greater than the threshold value (e.g., 0.25 ms or 0.5 ms), the sub-slot transmission may be treated the same way as a slot based PDSCH transmission. The field may indicate the number of slots after the slot for PDSCH transmission to the HARQ-ACK feedback. The regular HARQ-ACK timing and PUCCH resources may be used.

The use of slot based or symbol/sub-slot based timing may be determined based on which MCS table is used in the scheduling. A new MCS table is defined. For PDSCH and PUSCH with CP-OFDM, a new MCS table is introduced for URLLC, as given below in Table 5.

TABLE 5

| MCS Index $I_{MCS}$ | Modulation Order $Q_m$ | Code rate R × 1024 | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |

TABLE 5-continued

| MCS Index $I_{MCS}$ | Modulation Order $Q_m$ | Code rate R × 1024 | Spectral efficiency |
|---|---|---|---|
| 26 | 6 | 666 | 3.9023 |
| 27 | 6 | 719 | 4.2129 |
| 28 | 6 | 772 | 4.5234 |
| 29 | 2 | | reserved |
| 30 | 4 | | |
| 31 | 6 | | |

For a PDSCH scheduling, the MCS information field in DCI is 5-bit. If the DCI CRC is scrambled with the new RNTI, the new 64QAM MCS table may be used, the HARQ-ACK feedback may follow symbol/sub-slot level based timing, and sub-slot based PUCCH resource configuration and determination may be performed; otherwise, existing behavior may be followed (e.g., the HARQ-ACK feedback may follow slot based timing, and slot based PUCCH resource configuration and determination may be performed).

The DL SPS transmission may be a slot level or sub-slot level. For DL SPS, RRC indicates if the new 64QAM table is configured. The indication for the new MCS table for DL SPS is separate from the one for grant-based DL scheduling. Therefore, if the new MCS table is configured for a DL SPS transmission, the HARQ-ACK feedback of the DL SPS transmission may follow symbol/sub-slot level based timing, and sub-slot based PUCCH resource configuration and determination may be performed. If the new MCS table is not configured for a DL SPS transmission, the HARQ-ACK feedback of the DL SPS transmission may follow slot based timing, and slot based PUCCH resource configuration and determination may be performed.

To avoid confusion with slot level timing, in another method, a new bit may be introduced in the DCI format to indicate whether slot based or symbol/sub-slot based timing is applied.

PUCCH resource selection and determination for URLLC PDSCH is also described herein. Regardless of which method is used to determine the HARQ-ACK timing, the actual PUCCH resource to be used for HARQ-ACK reporting is closely related to the HARQ-ACK resource allocation methods. Furthermore, if the SCSs of DL and UL transmissions are different, the timing based on DL transmission may not align with the symbol boundary of an UL transmission.

In general, if the PUCCH resource is available and may start from any UL symbol, the PUCCH may be transmitted based on the determined HARQ-ACK timing. If the PUCCH resource is limited to start from certain symbol positions in a slot, the PUCCH may be transmitted on the earliest PUCCH resource within the allowed starting symbols that satisfies the HARQ-ACK timing (e.g., start at the same symbol or later based on the determined HARQ-ACK timing).

If the PUCCH resource is allowed to start from any symbol, the PUCCH resource may start from the symbol that is indicated by the HARQ-ACK timing with either method 1 or method 2 above. Note that in some cases, the PUCCH resource may cross a slot boundary (e.g., a 2-symbol PUCCH is configured and the HARQ-ACK timing points to the last symbol of a slot). Also, if the SCSs of DL and UL transmissions are different, the timing based on DL transmission may not align with the symbol boundary of an UL transmission, and the starting symbol for PUCCH may be shifted to the earliest UL symbol that satisfies the timing requirement.

If the PUCCH resource is configured with multiple starting symbol positions in a slot, the explicitly indicated or implicitly determined HARQ-ACK timing may point to a symbol that is different from the configured or allowed starting symbol positions. The allowed starting symbol positions may be configured with the methods provided above (e.g., multiple PUCCH resources with different starting symbols, a single PUCCH resource with multiple allowed starting symbol positions). The starting symbol positions may be configured by a set of symbol indexes, or an index to a RRC configured table containing the allowed symbol indexes, or based on pre-defined or configured patterns.

In the case of a subset consisting of multiple PUCCH resources with different starting symbols, multiple resource subsets may be configured within each PUCCH resource set for a given payload range. The PUCCH resource set may be determined based on the UCI payload size, and the ARI indicates the subset in the selected PUCCH resource set. To provide low latency feedback, the PUCCH resource determination rule within a subset may be changed. Instead of implicitly mapping based on CCE index of the last scheduling DCI, the actual PUCCH resource for UCI transmission may be determined based on the HARQ-ACK timing. For instance, the PUCCH resource with earliest starting symbol while satisfying the HARQ-ACK feedback timing requirement may be selected. The HARQ-ACK feedback timing may be indicated by a PDSCH-to-HARQ-timing indicator field or determined based on a pre-defined or configured HARQ-ACK time table.

In the case of a single PUCCH resource configured with multiple starting symbols in a slot, the PUCCH resource can be determined first in a PUCCH resource set for a given payload range by the ARI. If there is more than 1 PUCCH resource corresponding to an ARI in the PUCCH resource set, implicit mapping based on the CCE index of the scheduling DCI may be further applied. Once the PUCCH resource is selected, the actual PUCCH transmission may be determined based on the on the HARQ-ACK timing. For instance, the PUCCH resource with earliest configured or allowed starting symbol while satisfying the HARQ-ACK feedback timing requirement may be selected. The HARQ-ACK feedback timing may be indicated by a PDSCH-to-HARQ-timing indicator field or determined based on a pre-defined or configured HARQ-ACK time table.

Similarly, if the PUCCH resource is configured with a PUCCH format and a periodicity, the explicit indicated or implicitly determined HARQ-ACK timing may point to a symbol that is different from the configured starting symbol positions. In this case, the PUCCH resource with earliest configured or allowed starting symbol while satisfying the HARQ-ACK feedback timing requirement may be selected.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL sub frame. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for PUCCH configuration and resource allocation as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

FIG. 2 is an example illustrating sub-slot URLLC PDSCH and HARQ-ACK feedback within 1 subframe.

FIG. 3 illustrates examples of starting symbol positions for 15 kilohertz (kHz) subcarrier spacing (SCS). The 1-symbol PUCCH may be beneficial for 15 kHz SCS. FIG. 3*a* depicts two starting symbol positions with 1-symbol PUCCH in a slot with 15 kHz SCS and extended CP. FIG. 3*b* depicts three starting symbol positions with 1-symbol PUCCH in a slot with 15 kHz SCS and extended CP. FIG. 3*c* depicts two starting symbol positions with 2-symbol PUCCH in a slot with 15 kHz SCS and extended CP. FIG. 3*d* depicts two starting symbol positions with 1-symbol PUCCH in a slot with 15 kHz SCS and normal CP. FIG. 3*e* depicts three starting symbol positions with 1-symbol PUCCH in a slot with 15 kHz SCS and normal CP. FIG. 3*f* depicts two starting symbol positions with 2-symbol PUCCH in a slot with 15 kHz SCS and normal CP.

With 1-symbol PUCCH, 2 or 3 starting positions may be configured, as shown in FIGS. 3*a* and 3*b* for extended CP, and FIGS. 3*d* and 3*e* for normal CP. With 2-symbol PUCCH, only 2 starting positions may be configured, as shown in FIG. 3*c* for extended CP, and FIG. 3*f* for normal CP.

FIG. 4 illustrates examples of starting symbol positions for 30 kHz SCS. FIG. 4*a* depicts one starting symbol position with 1-symbol PUCCH in a slot with 30 kHz SCS and extended CP. FIG. 4*b* depicts one starting symbol position with 2-symbol PUCCH in a slot with 30 kHz SCS and extended CP. FIG. 4*c* depicts two starting symbol positions with 1-symbol PUCCH in a slot with 30 kHz SCS and extended CP. FIG. 4*d* depicts two starting symbol positions with 2-symbol PUCCH in a slot with 30 kHz SCS and extended CP. FIG. 4*e* depicts one starting symbol position with 1-symbol PUCCH in a slot with 30 kHz SCS and normal CP. FIG. 4*f* depicts one starting symbol position with 2-symbol PUCCH in a slot with 30 kHz SCS and normal CP. FIG. 4*g* depicts two starting symbol positions with 1-symbol PUCCH in a slot with 30 kHz SCS and normal CP. FIG. 4*h* depicts two starting symbol positions with 2-symbol PUCCH in a slot with 30 kHz SCS and normal CP.

FIG. 5 illustrates examples of starting symbol positions for 60 kHz SCS. Considering the sub-slot PDSCH transmission processing time, 1 PUCCH allocation in each slot can provide 4 potential starting positions in a subframe, as shown in FIG. 5*a*. Considering the HARQ-ACK processes, the maximum number of re-transmissions may be limited to 3. Thus, 4 potential PUCCH positions within a 1 ms subframe should be sufficient to guarantee the 1 ms delay requirements and the ultra-reliability of data delivery. If only 2 PUCCH positions are required in a subframe, the PUCCH resource may be configured in some slots, but not in other slots, as shown in FIG. 5*b*. The patterns can be fixed for each configuration based on the PUCCH duration.

FIG. 6 illustrates an example of time domain distribution and multiplexing of PUCCH allocation for different UEs 102. FIG. 6 depicts a starting symbol position for a first UE (UE1) and a starting symbol position for a second UE (UE2).

Figure 7:
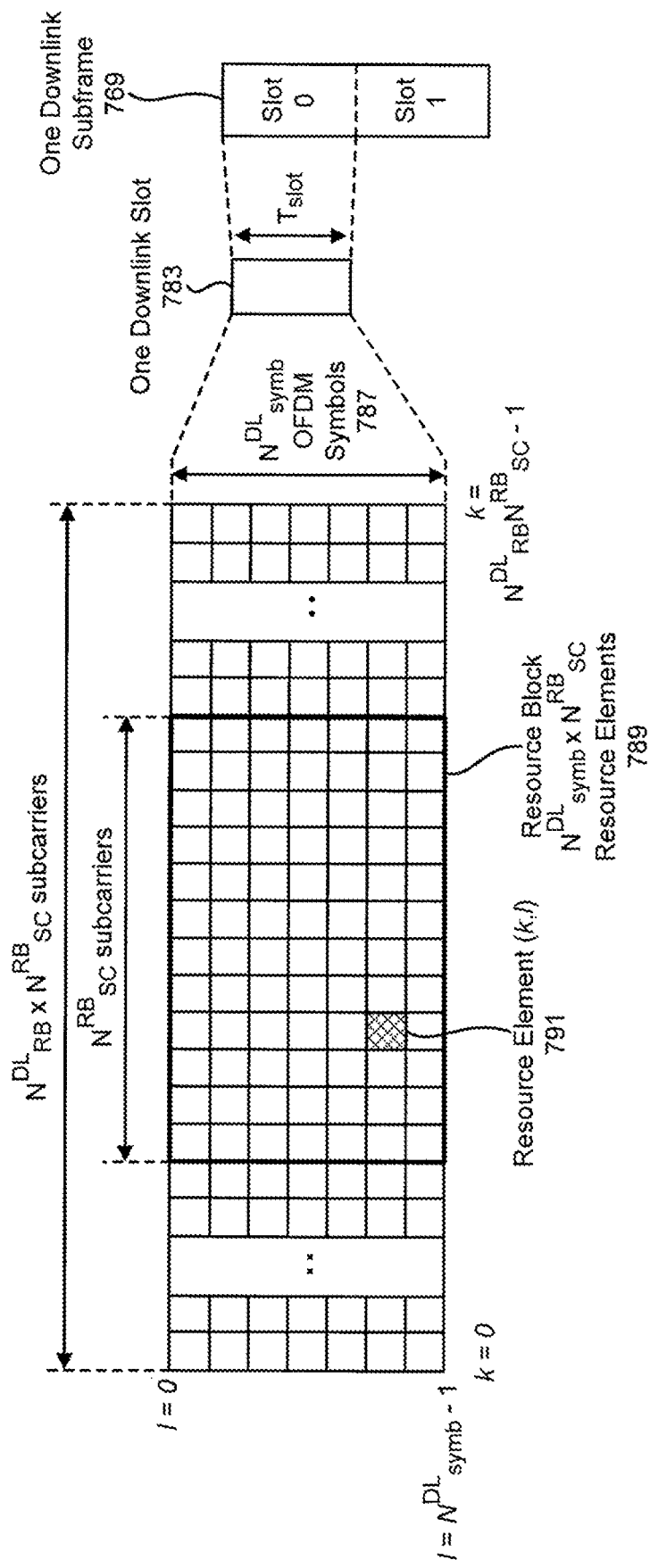
FIG. 7 is a diagram illustrating an example of a resource grid for the downlink.

FIG. 7 is a diagram illustrating one example of a resource grid for the downlink. The resource grid illustrated in FIG. 7 may be utilized in some implementations of the systems and methods disclosed herein. More detail regarding the resource grid is given in connection with FIG. 1.

In FIG. 7, one downlink subframe 769 may include two downlink slots 783. $N^{DL}_{RB}$ is downlink bandwidth configuration of the serving cell, expressed in multiples of $N^{RB}_{sc}$, where $N^{RB}_{sc}$ is a resource block 789 size in the frequency domain expressed as a number of subcarriers, and $N^{DL}_{symb}$ is the number of OFDM symbols 787 in a downlink slot 783. A resource block 789 may include a number of resource elements (RE) 791.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 791 may be the RE 791 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 8:
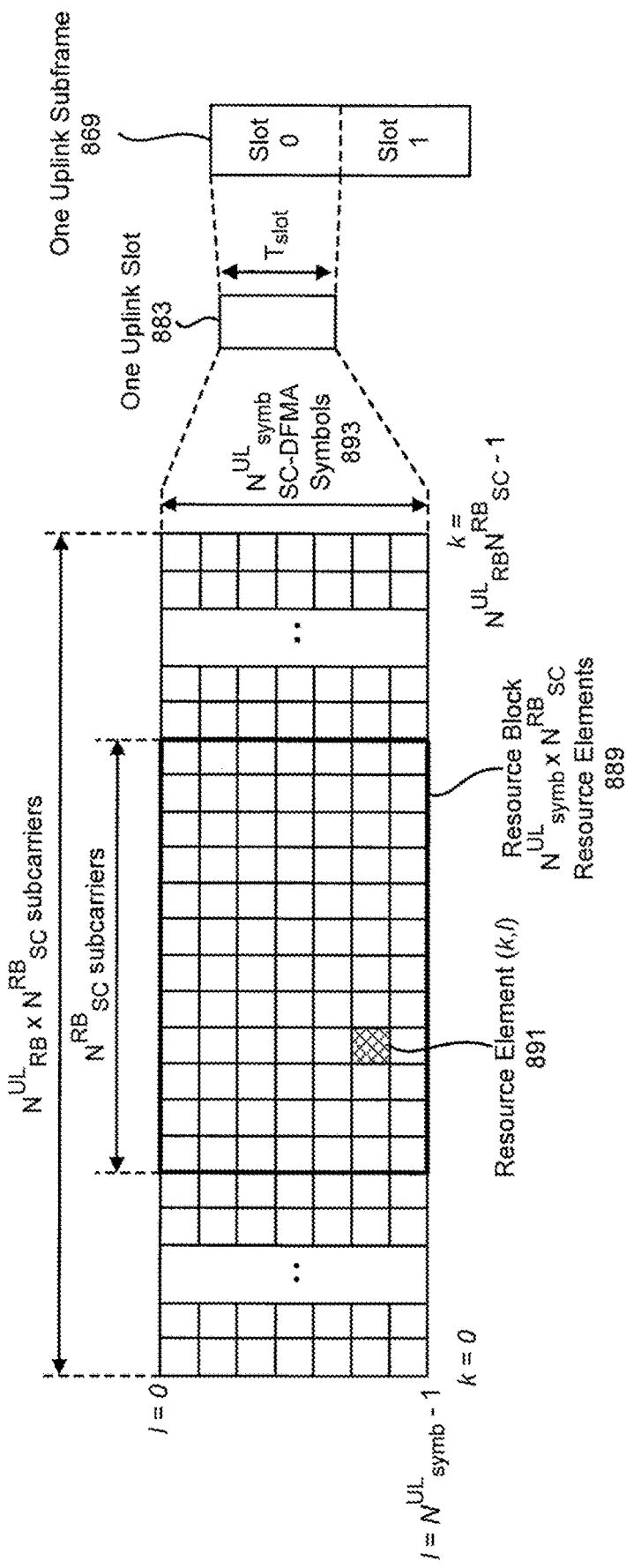
FIG. 8 is a diagram illustrating one example of a resource grid for the uplink.

FIG. 8 is a diagram illustrating one example of a resource grid for the uplink. The resource grid illustrated in FIG. 8 may be utilized in some implementations of the systems and methods disclosed herein. More detail regarding the resource grid is given in connection with FIG. 1.

In FIG. 8, one uplink subframe 869 may include two uplink slots 883. $N^{UL}_{RB}$ is uplink bandwidth configuration of the serving cell, expressed in multiples of $N^{RB}_{sc}$, where $N^{RB}_{sc}$ is a resource block 889 size in the frequency domain expressed as a number of subcarriers, and $N^{UL}_{symb}$ is the number of SC-FDMA symbols 893 in an uplink slot 883. A resource block 889 may include a number of resource elements (RE) 891.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 9:
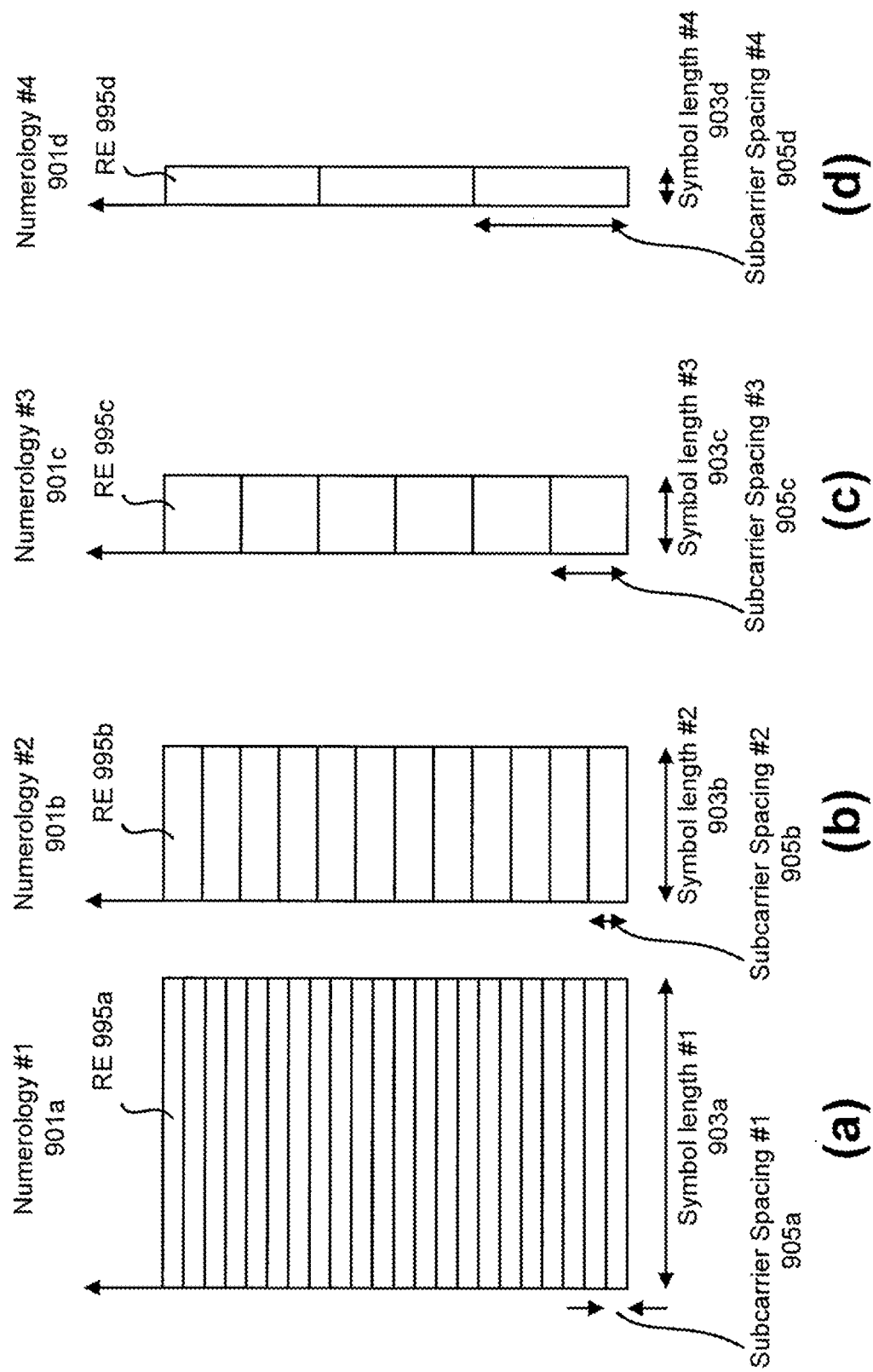
FIG. 9 shows examples of several numerologies.

FIG. 9 shows examples of several numerologies 901. The numerology #1 901*a* may be a basic numerology (e.g., a reference numerology). For example, a RE 995*a* of the basic numerology 901*a* may be defined with subcarrier spacing 905*a* of 15 kHz in frequency domain and 2048 Ts+CP length (e.g., 160 Ts or 144 Ts) in time domain (i.e., symbol length #1 903*a*), where Ts denotes a baseband sampling time unit defined as 1/(15000*2048) seconds. For the i-th numerology, the subcarrier spacing 905 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 9 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 10:
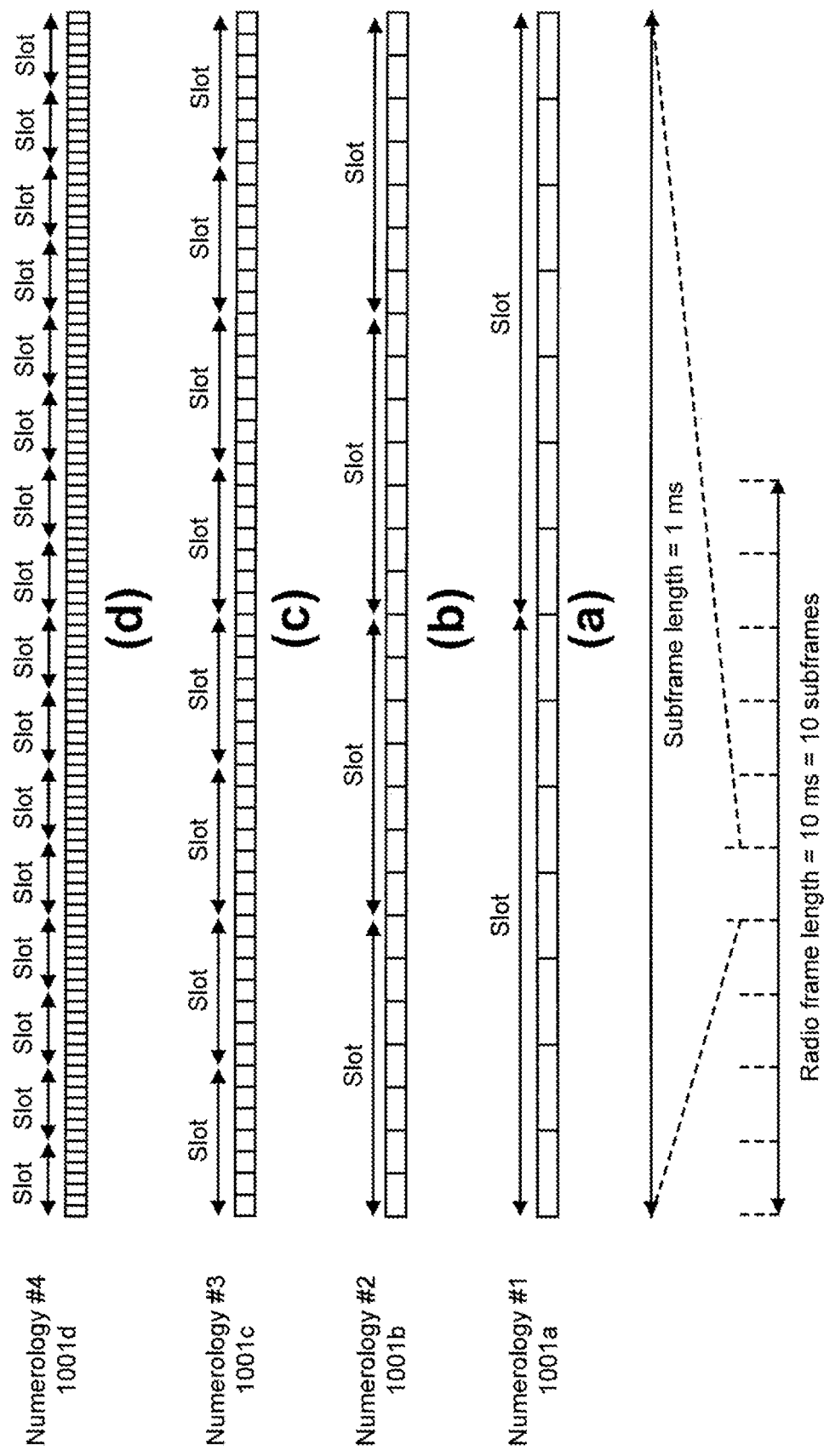
FIG. 10 shows examples of subframe structures for the numerologies that are shown in FIG. 9.

FIG. 10 shows examples of subframe structures for the numerologies 1001 that are shown in FIG. 9. Given that a slot 1083 includes $N^{DL}_{symb}$ (or $N^{UL}_{symb}$)=7 symbols, the slot length of the i+1-th numerology 1001 is a half of the one for the i-th numerology 1001, and eventually the number of slots 1083 in a subframe (i.e., 1 ms) becomes double. It may be noted that a radio frame may include 10 subframes, and the radio frame length may be equal to 10 ms.

Figure 11:
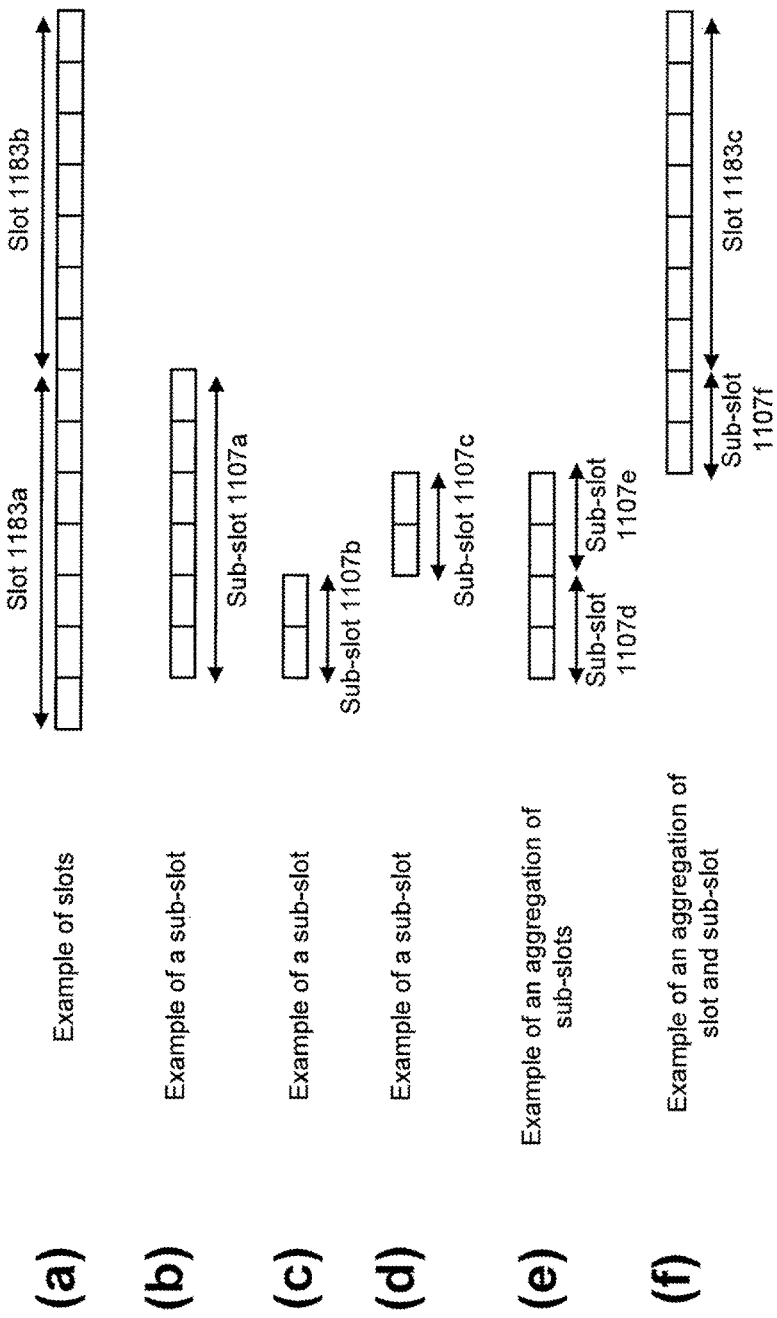
FIG. 11 shows examples of slots and sub-slots.

FIG. 11 shows examples of slots 1183 and sub-slots 1107. If a sub-slot 1107 is not configured by higher layer, the UE 102 and the eNB/gNB 160 may only use a slot 1183 as a scheduling unit. More specifically, a given transport block may be allocated to a slot 1183. If the sub-slot 1107 is configured by higher layer, the UE 102 and the eNB/gNB 160 may use the sub-slot 1107 as well as the slot 1183. The sub-slot 1107 may include one or more OFDM symbols. The maximum number of OFDM symbols that constitute the sub-slot 1107 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 1107 may start at any symbol within a slot 1183 unless it collides with a control channel. There could be restrictions of mini-slot length based on restrictions on starting position. For example, the sub-slot 1107 with the length of $N^{DL}_{symb}-1$ (or $N^{UL}_{symb}-1$) may start at the second symbol in a slot 1183. The starting position of a sub-slot 1107 may be indicated by a physical layer control channel (e.g., by DCI format). Alternatively, the starting position of a sub-slot 1107 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 1107.

In cases when the sub-slot 1107 is configured, a given transport block may be allocated to either a slot 1183, a sub-slot 1107, aggregated sub-slots 1107 or aggregated sub-slot(s) 1107 and slot 1183. This unit may also be a unit for HARQ-ACK bit generation.

Figure 12:
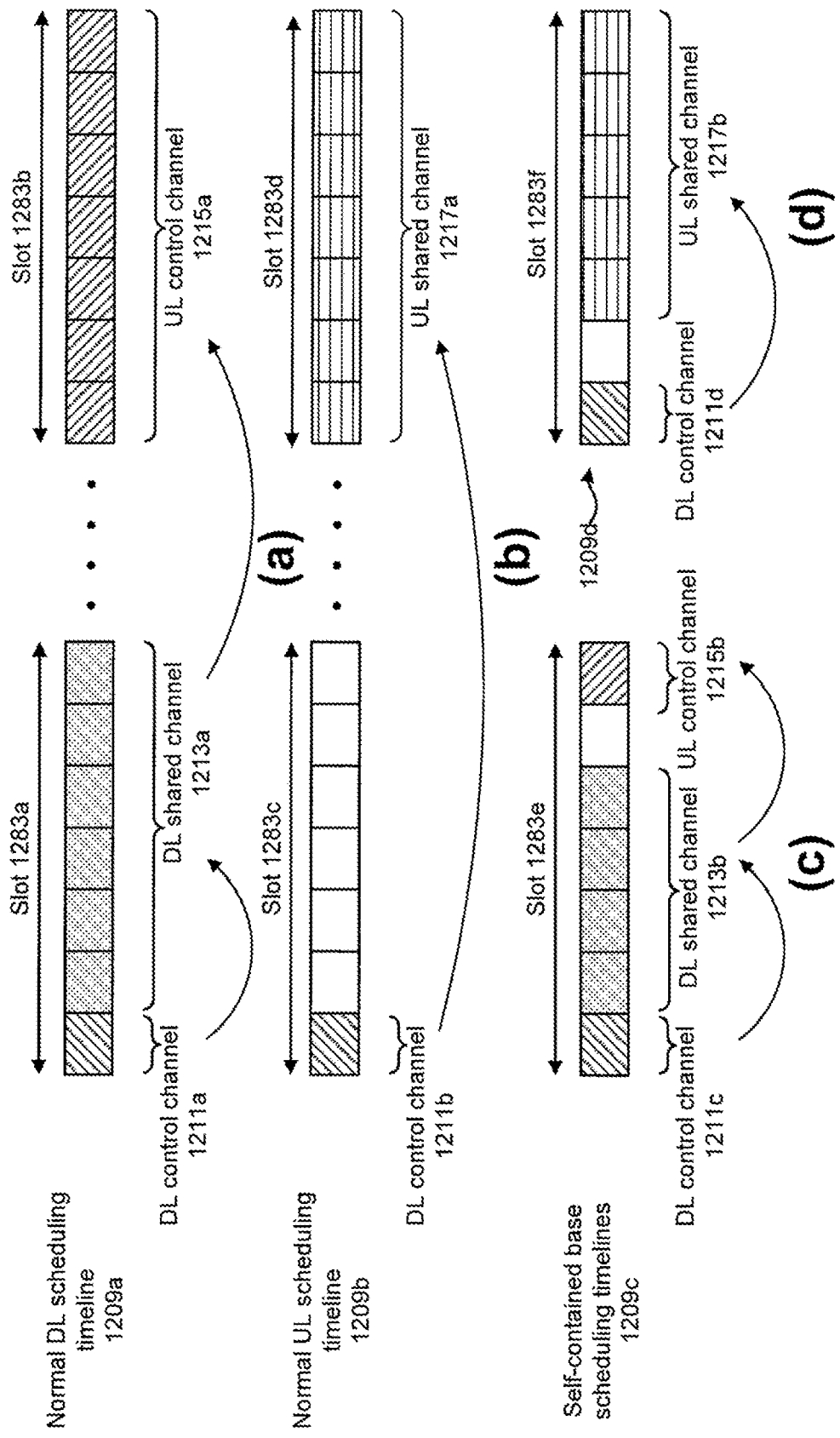
FIG. 12 shows examples of scheduling timelines.

FIG. 12 shows examples of scheduling timelines 1209. For a normal DL scheduling timeline 1209a, DL control channels are mapped the initial part of a slot 1283a. The DL control channels 1211 schedule DL shared channels 1213a in the same slot 1283a. HARQ-ACKs for the DL shared channels 1213a (i.e., HARQ-ACKs each of which indicates whether or not transport block in each DL shared channel 1213a is detected successfully) are reported via UL control channels 1215a in a later slot 1283b. In this instance, a given slot 1283 may contain either one of DL transmission and UL transmission.

For a normal UL scheduling timeline 1209b, DL control channels 1211b are mapped the initial part of a slot 1283c. The DL control channels 1211b schedule UL shared channels 1217a in a later slot 1283d. For these cases, the association timing (time shift) between the DL slot 1283c and the UL slot 1283d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 1209c, DL control channels 1211c are mapped to the initial part of a slot 1283e. The DL control channels 1211c schedule DL shared channels 1213b in the same slot 1283e. HARQ-ACKs for the DL shared channels 1213b are reported in UL control channels 1215b, which are mapped at the ending part of the slot 1283e.

For a self-contained base UL scheduling timeline 1209d, DL control channels 1211d are mapped to the initial part of a slot 1283f. The DL control channels 1211d schedule UL shared channels 1217b in the same slot 1283f. For these cases, the slot 1283f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 13:
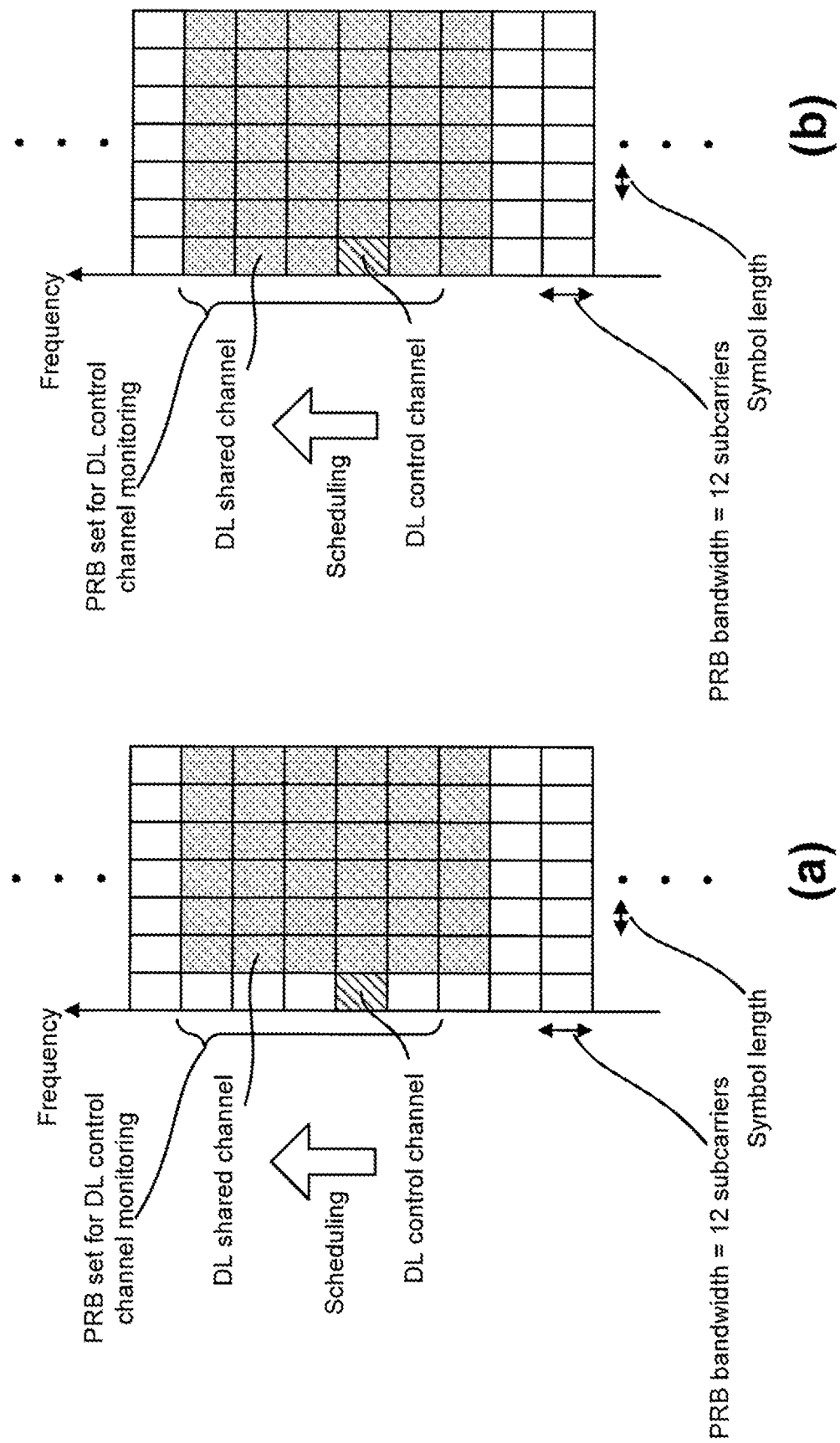
FIG. 13 shows examples of DL control channel monitoring regions.

FIG. 13 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 14:
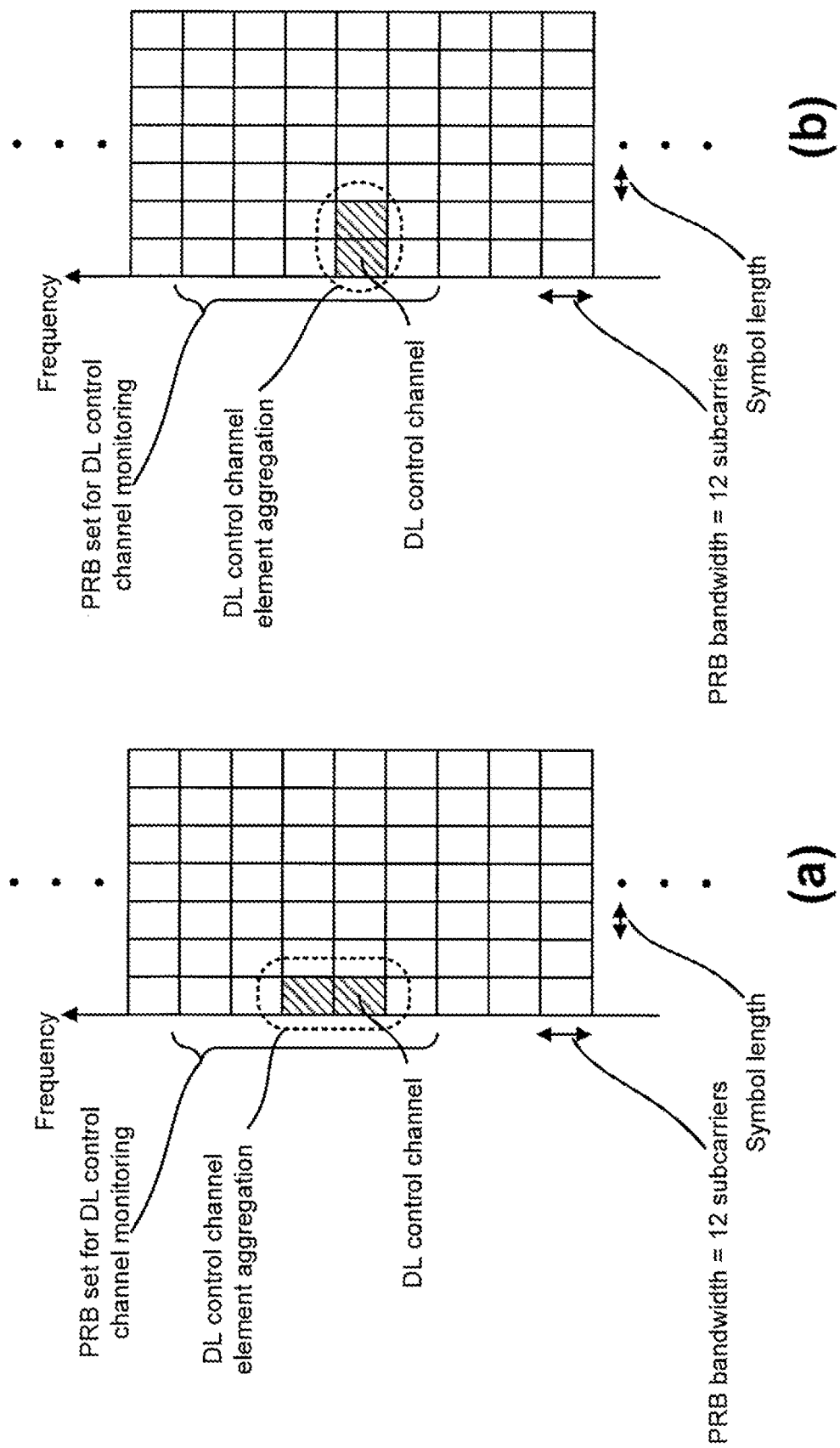
FIG. 14 shows examples of DL control channel which includes more than one control channel elements.

FIG. 14 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 15:
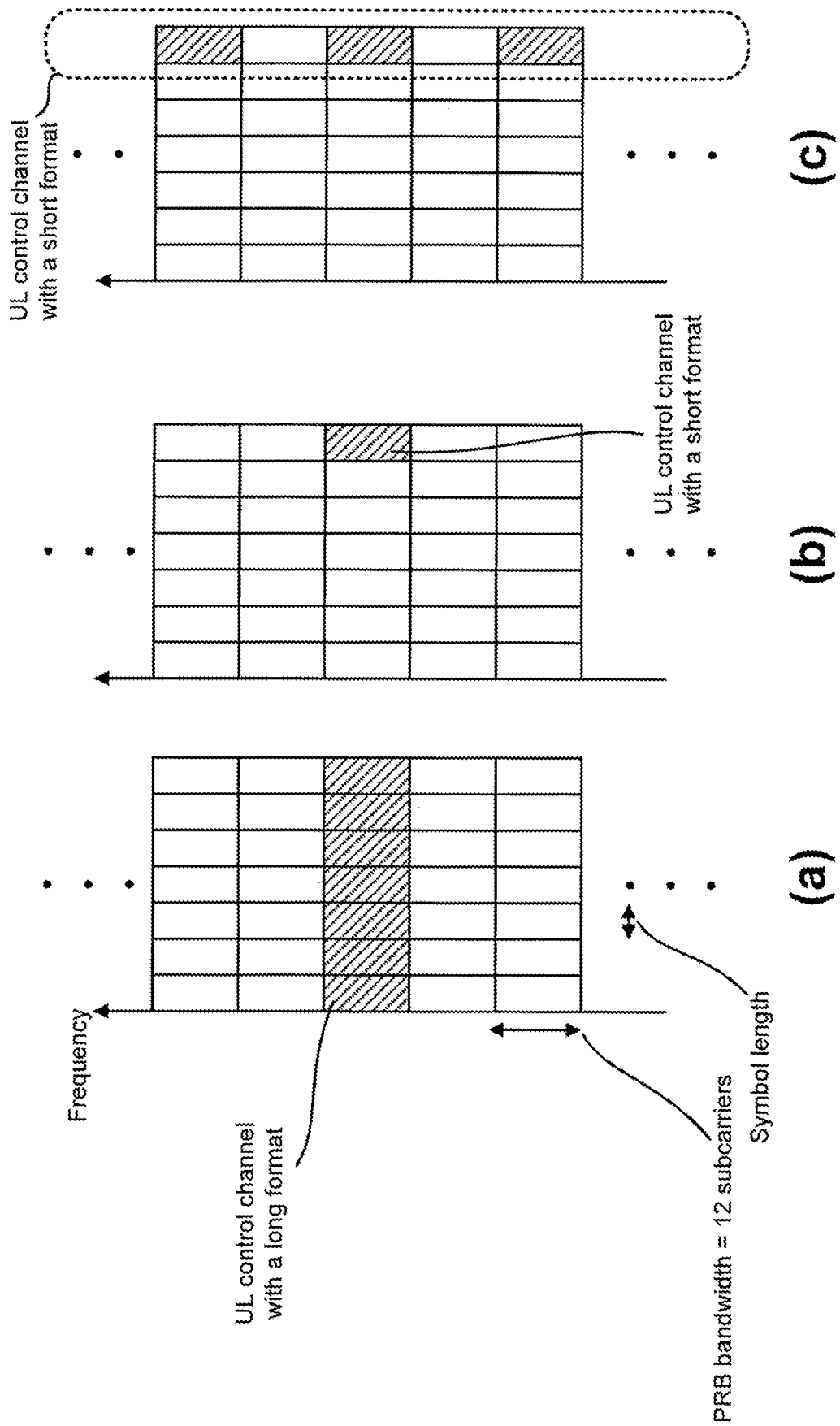
FIG. 15 shows examples of UL control channel structures.

FIG. 15 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 16:
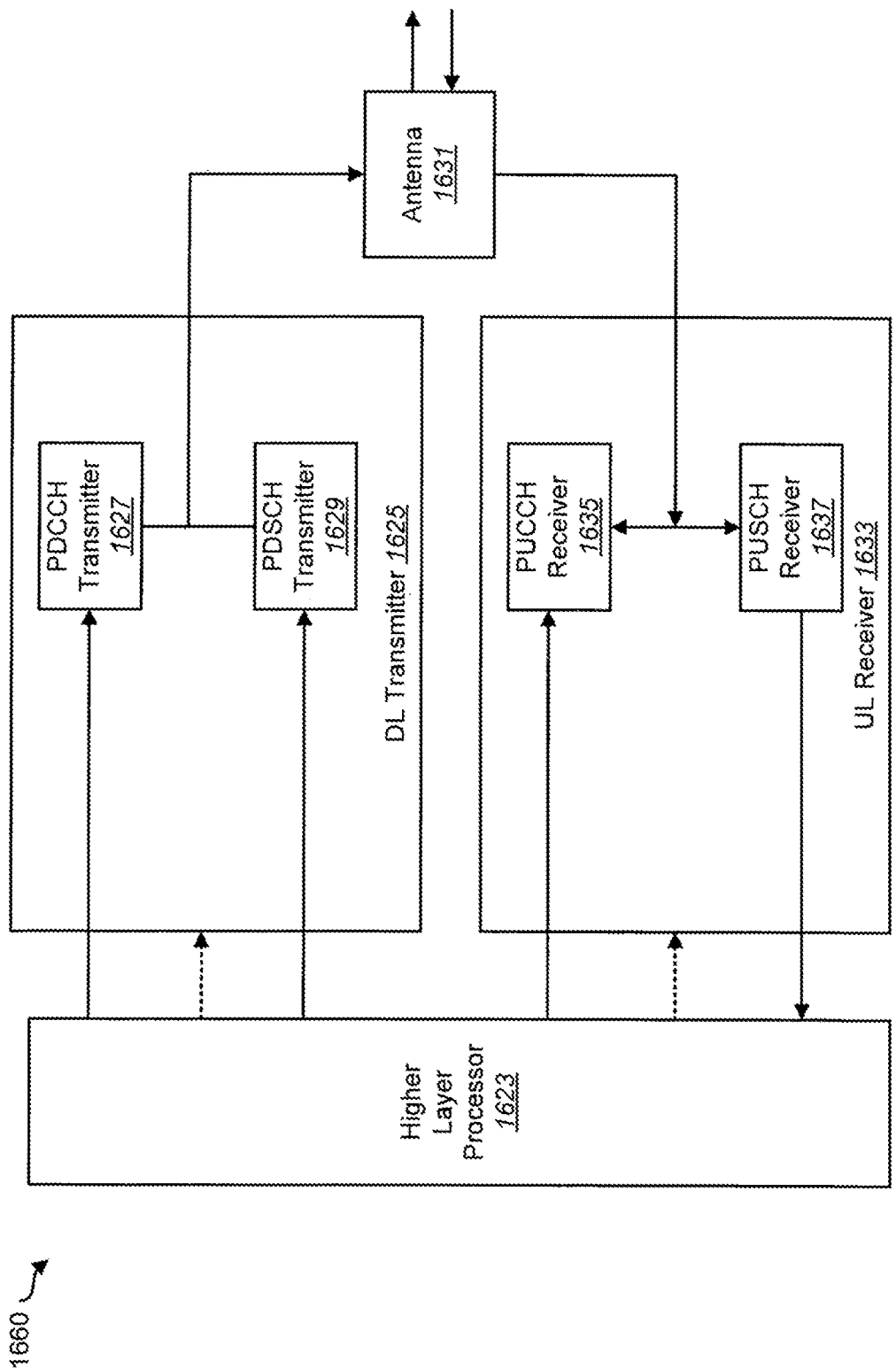
FIG. 16 is a block diagram illustrating one implementation of a gNB.

FIG. 16 is a block diagram illustrating one implementation of a gNB 1660. The gNB 1660 may include a higher layer processor 1623, a DL transmitter 1625, a UL receiver 1633, and one or more antenna 1631. The DL transmitter 1625 may include a PDCCH transmitter 1627 and a PDSCH transmitter 1629. The UL receiver 1633 may include a PUCCH receiver 1635 and a PUSCH receiver 1637.

The higher layer processor 1623 may manage physical layer's behaviors (the DL transmitter's and the UL receiver's behaviors) and provide higher layer parameters to the physical layer. The higher layer processor 1623 may obtain transport blocks from the physical layer. The higher layer processor 1623 may send/acquire higher layer messages such as an RRC message and MAC message to/from a UE's higher layer. The higher layer processor 1623 may provide the PDSCH transmitter transport blocks and provide the PDCCH transmitter transmission parameters related to the transport blocks.

The DL transmitter 1625 may multiplex downlink physical channels and downlink physical signals (including reservation signal) and transmit them via transmission antennas 1631. The UL receiver 1633 may receive multiplexed uplink physical channels and uplink physical signals via receiving antennas 1631 and de-multiplex them. The PUCCH receiver 1635 may provide the higher layer processor 1623 UCI. The PUSCH receiver 1637 may provide the higher layer processor 1623 received transport blocks.

Figure 17:
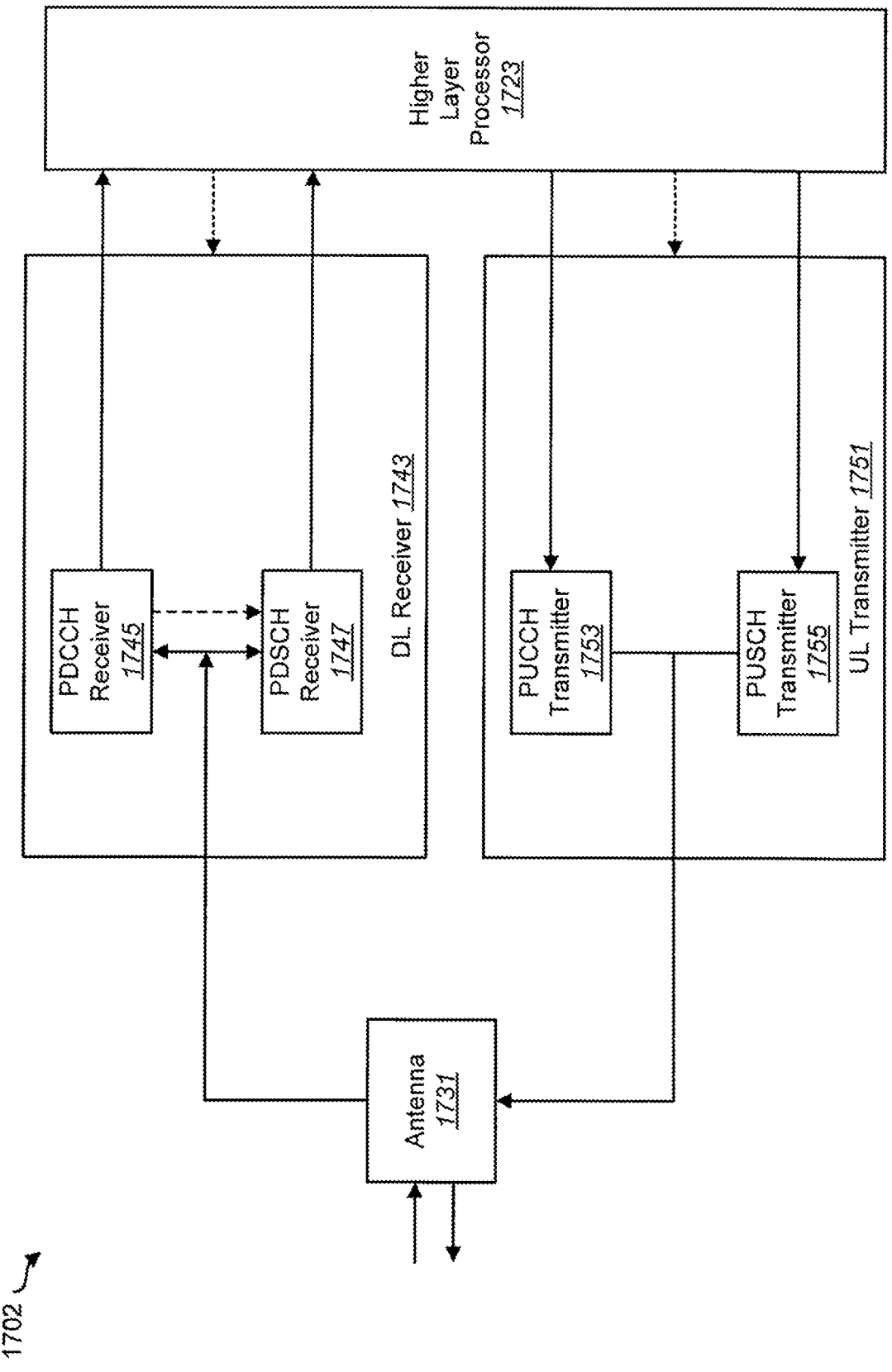
FIG. 17 is a block diagram illustrating one implementation of a UE.

FIG. 17 is a block diagram illustrating one implementation of a UE 1702. The UE 1702 may include a higher layer processor 1723, a UL transmitter 1751, a DL receiver 1743, and one or more antenna 1731. The UL transmitter 1751 may include a PUCCH transmitter 1753 and a PUSCH transmitter 1755. The DL receiver 1743 may include a PDCCH receiver 1745 and a PDSCH receiver 1747.

The higher layer processor 1723 may manage physical layer's behaviors (the UL transmitter's and the DL receiver's behaviors) and provide higher layer parameters to the physical layer. The higher layer processor 1723 may obtain transport blocks from the physical layer. The higher layer processor 1723 may send/acquire higher layer messages such as an RRC message and MAC message to/from a UE's higher layer. The higher layer processor 1723 may provide the PUSCH transmitter transport blocks and provide the PUCCH transmitter 1753 UCI.

The DL receiver 1743 may receive multiplexed downlink physical channels and downlink physical signals via receiving antennas 1731 and de-multiplex them. The PDCCH receiver 1745 may provide the higher layer processor 1723 DCI. The PDSCH receiver 1747 may provide the higher layer processor 1723 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 18:
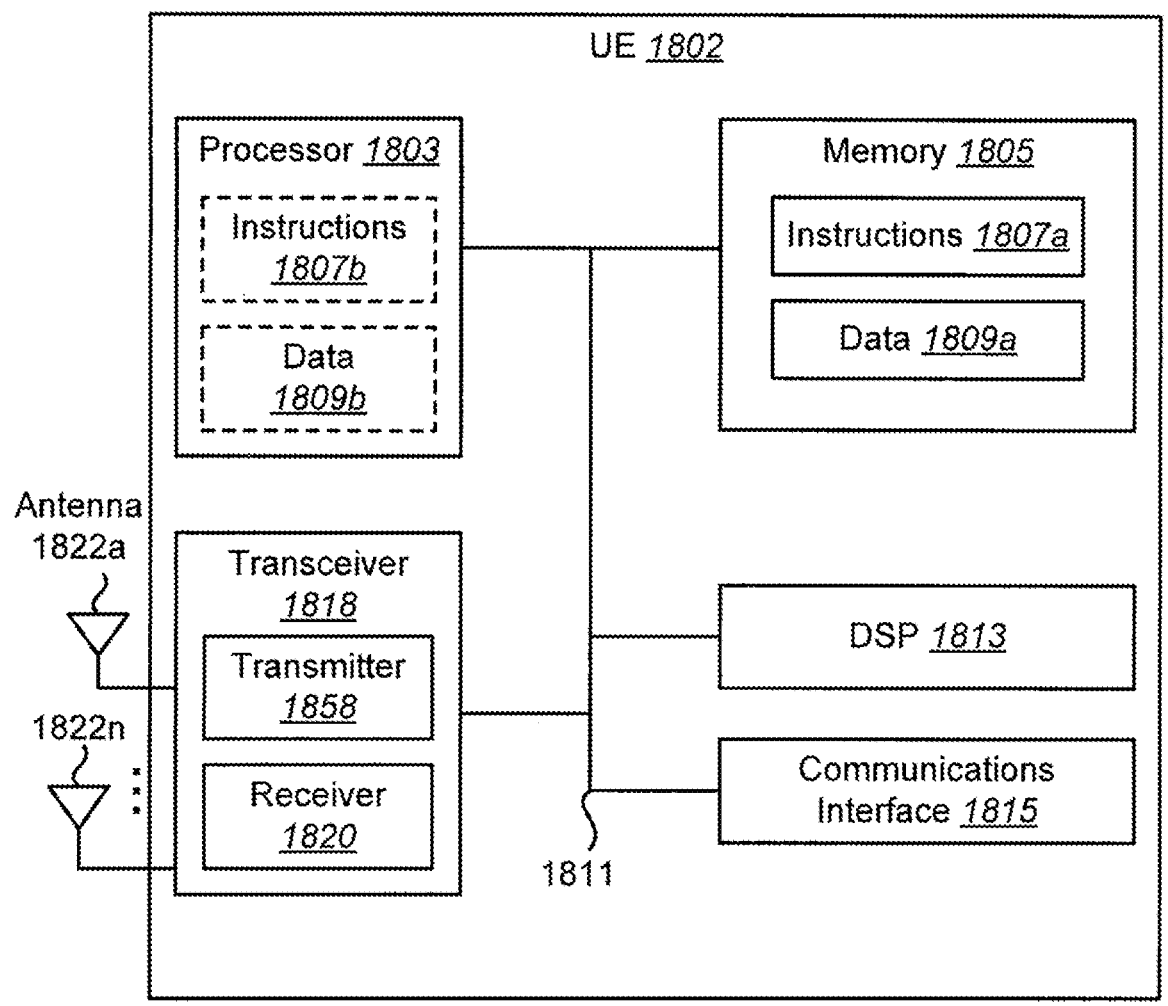
FIG. 18 illustrates various components that may be utilized in a UE.

FIG. 18 illustrates various components that may be utilized in a UE 1802. The UE 1802 described in connection with FIG. 18 may be implemented in accordance with the UE 102 described in connection with FIG. 1. The UE 1802 includes a processor 1803 that controls operation of the UE 1802. The processor 1803 may also be referred to as a central processing unit (CPU). Memory 1805, which may include read-only memory (ROM), random access memory (RAM), a combination of the two or any type of device that may store information, provides instructions 1807a and data 1809a to the processor 1803. A portion of the memory 1805 may also include non-volatile random-access memory (NVRAM). Instructions 1807b and data 1809b may also reside in the processor 1803. Instructions 1807b and/or data 1809b loaded into the processor 1803 may also include instructions 1807a and/or data 1809a from memory 1805 that were loaded for execution or processing by the processor 1803. The instructions 1807b may be executed by the processor 1803 to implement the methods described above.

The UE 1802 may also include a housing that contains one or more transmitters 1858 and one or more receivers 1820 to allow transmission and reception of data. The transmitter(s) 1858 and receiver(s) 1820 may be combined into one or more transceivers 1818. One or more antennas 1822a-n are attached to the housing and electrically coupled to the transceiver 1818.

The various components of the UE 1802 are coupled together by a bus system 1811, which may include a power bus, a control signal bus and a status signal bus, in addition to a data bus. However, for the sake of clarity, the various buses are illustrated in FIG. 18 as the bus system 1811. The UE 1802 may also include a digital signal processor (DSP) 1813 for use in processing signals. The UE 1802 may also include a communications interface 1815 that provides user access to the functions of the UE 1802. The UE 1802 illustrated in FIG. 18 is a functional block diagram rather than a listing of specific components.

Figure 19:
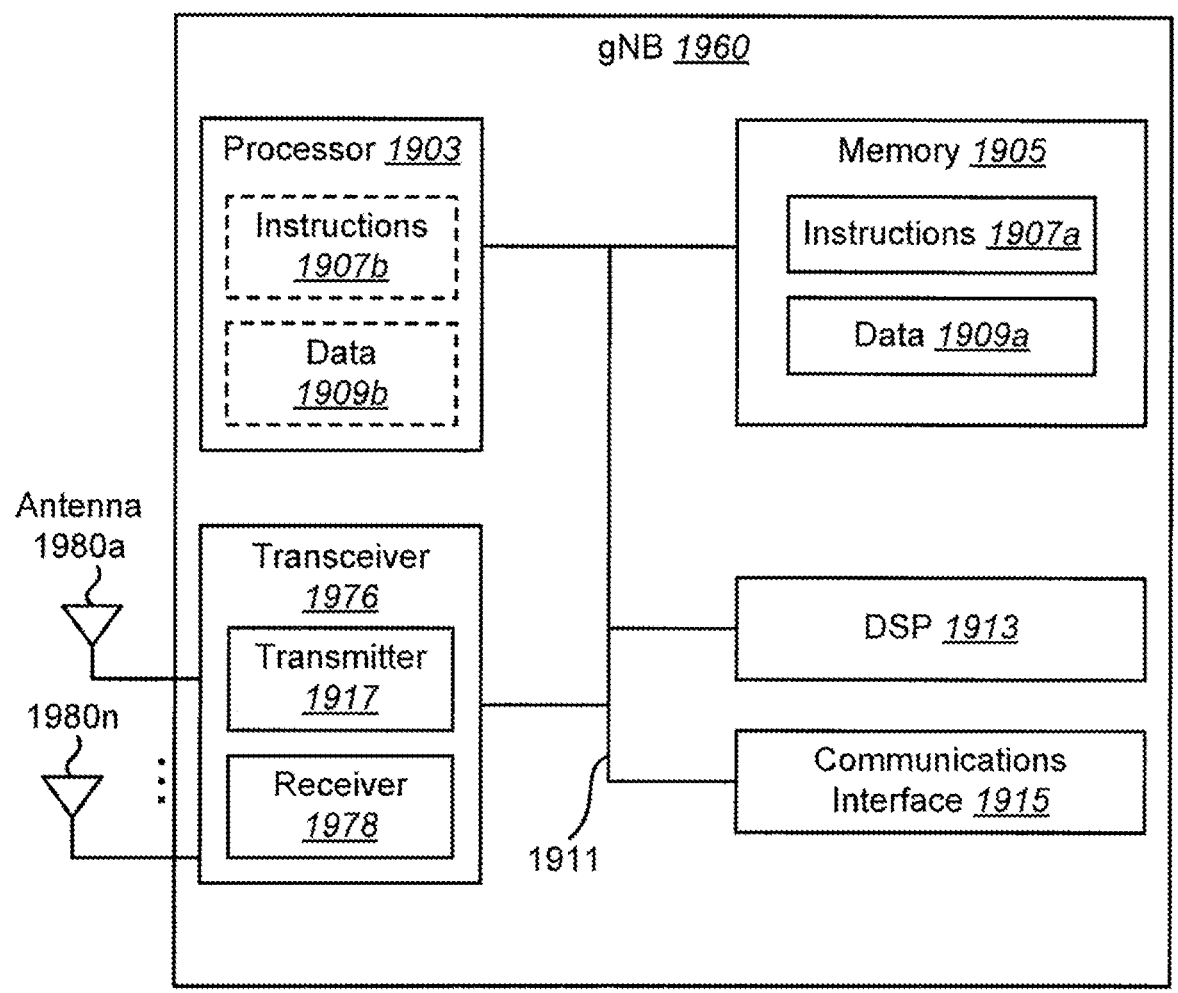
FIG. 19 illustrates various components that may be utilized in a gNB.

FIG. 19 illustrates various components that may be utilized in a gNB 1960. The gNB 1960 described in connection with FIG. 19 may be implemented in accordance with the gNB 160 described in connection with FIG. 1. The gNB 1960 includes a processor 1903 that controls operation of the gNB 1960. The processor 1903 may also be referred to as a central processing unit (CPU). Memory 1905, which may include read-only memory (ROM), random access memory (RAM), a combination of the two or any type of device that may store information, provides instructions 1907a and data 1909a to the processor 1903. A portion of the memory 1905 may also include non-volatile random-access memory (NVRAM). Instructions 1907b and data 1909b may also reside in the processor 1903. Instructions 1907b and/or data 1909b loaded into the processor 1903 may also include instructions 1907a and/or data 1909a from memory 1905 that were loaded for execution or processing by the processor 1903. The instructions 1907b may be executed by the processor 1903 to implement the methods described above.

The gNB 1960 may also include a housing that contains one or more transmitters 1917 and one or more receivers 1978 to allow transmission and reception of data. The transmitter(s) 1917 and receiver(s) 1978 may be combined into one or more transceivers 1976. One or more antennas 1980a-n are attached to the housing and electrically coupled to the transceiver 1976.

The various components of the gNB 1960 are coupled together by a bus system 1911, which may include a power bus, a control signal bus and a status signal bus, in addition to a data bus. However, for the sake of clarity, the various buses are illustrated in FIG. 19 as the bus system 1911. The gNB 1960 may also include a digital signal processor (DSP) 1913 for use in processing signals. The gNB 1960 may also include a communications interface 1915 that provides user access to the functions of the gNB 1960. The gNB 1960 illustrated in FIG. 19 is a functional block diagram rather than a listing of specific components.

Figure 20:
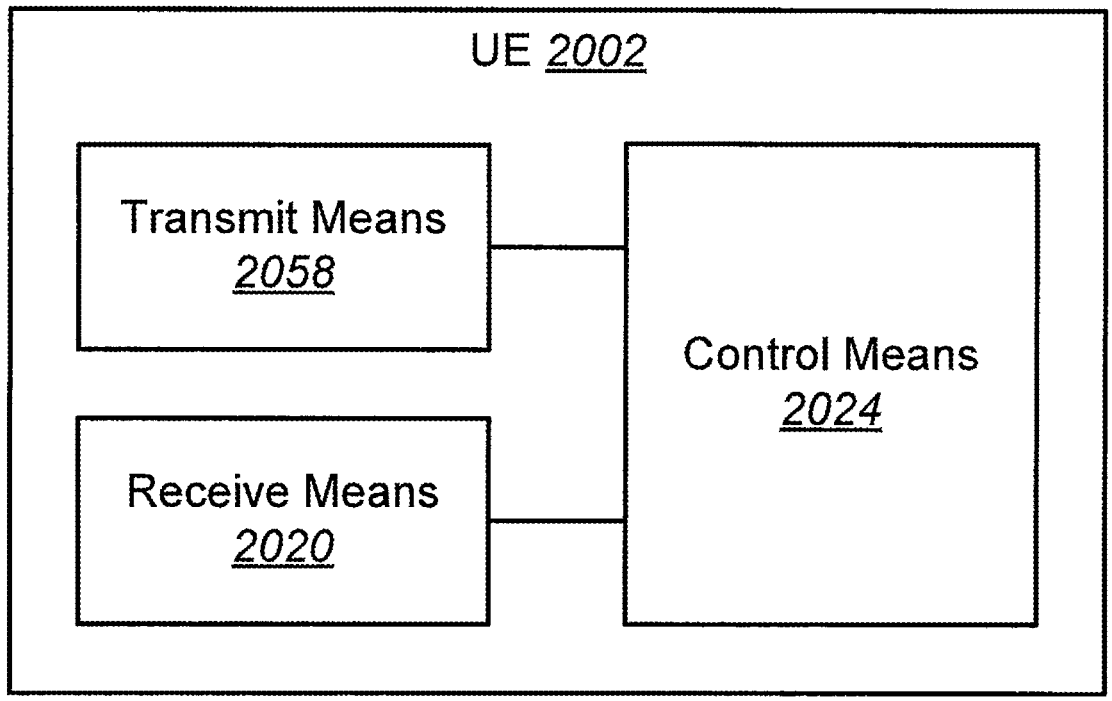
FIG. 20 is a block diagram illustrating one implementation of a UE in which systems and methods for HARQ-ACK timing and PUCCH resource determination for ultra-low latency PDSCH transmission may be implemented.

FIG. 20 is a block diagram illustrating one implementation of a UE 2002 in which systems and methods for HARQ-ACK timing and PUCCH resource determination for ultra-low latency PDSCH transmission may be implemented. The UE 2002 includes transmit means 2058, receive means 2020 and control means 2024. The transmit means 2058, receive means 2020 and control means 2024 may be configured to perform one or more of the functions described in connection with FIG. 1 above. FIG. 18 above illustrates one example of a concrete apparatus structure of FIG. 20. Other various structures may be implemented to realize one or more of the functions of FIG. 1. For example, a DSP may be realized by software.

Figure 21:
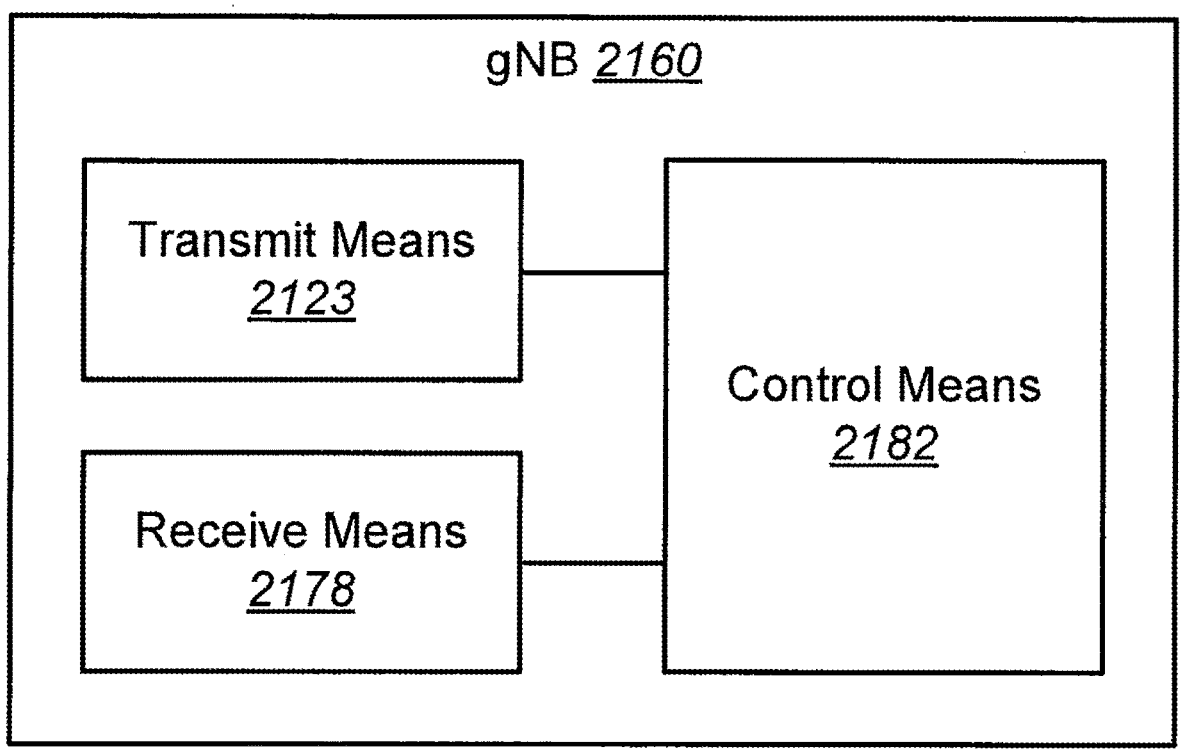
FIG. 21 is a block diagram illustrating one implementation of a gNB in which systems and methods for HARQ-ACK timing and PUCCH resource determination for ultra-low latency PDSCH transmission may be implemented.

FIG. 21 is a block diagram illustrating one implementation of a gNB 2160 in which systems and methods for HARQ-ACK timing and PUCCH resource determination for ultra-low latency PDSCH transmission may be implemented. The gNB 2160 includes transmit means 2123, receive means 2178 and control means 2182. The transmit means 2123, receive means 2178 and control means 2182 may be configured to perform one or more of the functions described in connection with FIG. 1 above. FIG. 19 above illustrates one example of a concrete apparatus structure of FIG. 21. Other various structures may be implemented to realize one or more of the functions of FIG. 1. For example, a DSP may be realized by software.

The term "computer-readable medium" refers to any available medium that can be accessed by a computer or a processor. The term "computer-readable medium", as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with laser.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE), comprising:
a higher layer processor configured to:
   determine first Hybrid Automatic Repeat Request-Acknowledgment (HARQ-ACK) feedback timing of a first HARQ-ACK feedback used for a first physical downlink shared channel (PDSCH) transmission;
   determine second HARQ-ACK feedback timing of a second HARQ-ACK feedback used for a second PDSCH transmission;
   determine a first physical uplink control channel (PUCCH) resource for the first HARQ-ACK feedback; and
   determine a second PUCCH resource for the second HARQ-ACK feedback; and
transmitting circuitry configured to:
   transmit at least a first HARQ-ACK bit based on the first HARQ-ACK feedback timing and the first PUCCH resource; and
   transmit at least a second HARQ-ACK bit based on the second HARQ-ACK feedback timing and the second PUCCH resource, wherein:
   the first HARQ-ACK feedback timing is determined by a first PDSCH-to-HARQ-timing indicator field in first Downlink Control Information (DCI),
   the first PDSCH-to-HARQ-timing indicator field corresponds to a value of a first radio resource control (RRC) configured table,
   the second HARQ-ACK feedback timing is determined by a second PDSCH-to-HARQ-timing indicator field in second DCI,
   the second PDSCH-to-HARQ-timing indicator field corresponds to a value of a second RRC configured table,
   the first PDSCH-to-HARO-timing indicator field corresponding to the value of the first RRC configured table indicates a number of symbols or a number of sub-slots after the first PDSCH transmission,
   the first RRC configured table and the second RRC configured table are different RRC configured tables,
   the first PUCCH resource is selected from a first PUCCH resource set based on a first ACK resource indicator field in the first DCI,
   the second PUCCH resource is selected from a second PUCCH resource set based on a second resource indicator field in the second DCI,
   the first PUCCH resource set and the second PUCCH resource set are configured separately, and
   the first PUCCH resource set is for ultra-reliable low-latency communication (URLLC) and the second PUCCH resource set is for enhanced mobile broadband (eMBB).

2. The UE of claim 1, wherein the first DCI and the second DCI have different DCI formats.

3. The UE of claim 2, wherein the first PDSCH-to-HARQ-timing-indicator field is ignored or removed from the DCI format of the first DCI.

4. A base station (BS), comprising:
one or more non-transitory computer-readable media storing one or more instructions; and
at least one processor coupled to the one or more non-transitory computer-readable media and configured to execute the one or more instructions to cause the BS to:
   determine first Hybrid Automatic Repeat Request-Acknowledgment (HARQ-ACK) feedback timing of a first HARQ-ACK feedback used for a first physical downlink shared channel (PDSCH) transmission;
   determine second HARQ-ACK feedback timing of a second HARQ-ACK feedback used for a second PDSCH transmission;
   determine a first physical uplink control channel (PUCCH) resource for the first HARQ-ACK feedback; and
   determine a second PUCCH resource for the second HARQ-ACK feedback;
   receive at least a first HARQ-ACK bit based on the first HARQ-ACK feedback timing and the first PUCCH resource; and
   receive at least a second HARQ-ACK bit based on the second HARQ-ACK feedback timing and the second PUCCH resource, wherein:
   the first HARQ-ACK feedback timing is determined by a first PDSCH-to-HARQ-timing indicator field in first Downlink Control Information (DCI),
   the first PDSCH-to-HARQ-timing indicator field corresponds to a value of a first radio resource control (RRC) configured table,
   the second HARQ-ACK feedback timing is determined by a second PDSCH-to-HARQ-timing indicator field in second DCI,
   the second PDSCH-to-HARQ-timing indicator field corresponds to a value of a second RRC configured table,
   the first PDSCH-to-HARO-timing indicator field corresponding to the value of the first RRC configured table indicates a number of symbols or a number of sub-slots after the first PDSCH transmission,
   the first RRC configured table and the second RRC configured table are different RRC configured tables,
   the first PUCCH resource is selected from a first PUCCH resource set based on a first ACK resource indicator field in the first DCI,
   the second PUCCH resource is selected from a second PUCCH resource set based on a second resource indicator field in the second DCI,
   the first PUCCH resource set and the second PUCCH resource set are configured separately, and
   the first PUCCH resource set is for ultra-reliable low-latency communication (URLLC) and the second PUCCH resource set is for enhanced mobile broadband (eMBB).

5. The BS of claim 4, wherein the first DCI and the second DCI have different DCI formats.

6. The BS of claim 5 wherein the first PDSCH-to-HARQ-timing-indicator field is ignored or removed from the DCI format of the first DCI.

* * * * *